US012603676B2

(12) United States Patent
Buzzetti et al.

(10) Patent No.: US 12,603,676 B2
(45) Date of Patent: Apr. 14, 2026

(54) ACTIVE INDUCTOR ASSEMBLIES FOR DATA OVER POWER SYSTEMS AND ASSOCIATED METHODS

(71) Applicant: Analog Devices International Unlimited Company, Limerick (IE)

(72) Inventors: Siro Buzzetti, Arese (IT); Davide Benini, Noviglio (IT); Danilo Ranieri, Paderno Dugnano (IT)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 18/795,342

(22) Filed: Aug. 6, 2024

(65) Prior Publication Data

US 2026/0045968 A1      Feb. 12, 2026

(51) Int. Cl.
*H04B 3/54*          (2006.01)
*G05F 1/56*          (2006.01)

(52) U.S. Cl.
CPC ................ *H04B 3/54* (2013.01); *G05F 1/56* (2013.01)

(58) Field of Classification Search
CPC .................................... H04B 3/54; G05F 1/56
See application file for complete search history.

(56) References Cited

U.S. PATENT DOCUMENTS

| | | | |
|---|---|---|---|
| 11,038,490 B2 | 6/2021 | Gardner et al. | |
| 2021/0104953 A1 | 4/2021 | Gardner et al. | |
| 2023/0170859 A1* | 6/2023 | Singhal ................ H03F 1/3223 | |
| 2023/0283389 A1 | 9/2023 | Távora et al. | |

FOREIGN PATENT DOCUMENTS

CN          121485469 A          2/2026

OTHER PUBLICATIONS

Razavi, Behzad. "The Active Inductor [A circuit for All Seasons]". IEEE Solid-State Circuits Magazine. Jun. 23, 2020. (Year: 2020).*
"European Application Serial No. 25193179.6, Extended European Search Report mailed Jan. 26, 2026", 3 pgs.

* cited by examiner

*Primary Examiner* — David S Huang
(74) *Attorney, Agent, or Firm* — Schwegman Lundberg & Woessner, P.A.

(57)          ABSTRACT

An active inductor assembly for a data over power (DoP) system includes a first active inductor and a second active inductor. The first active inductor includes a first pass element and first control circuitry. The first control circuitry is configured to control the first pass element such that (i) the first pass element emulates a first inductor in response to changing voltage across the first pass element and (ii) the first pass element regulates a voltage drop across the first pass element during steady-state operation. The second active inductor includes a second pass element and second control circuitry. The second control circuitry is configured to control the second pass element such that (i) the second pass element emulates a second inductor in response to changing voltage across the second pass element and (ii) the second pass element regulates a voltage drop across the second pass element during steady-state operation.

20 Claims, 12 Drawing Sheets

1400

Station
204(1)

246(1)

248(1)

Station
204(2)

246(2)

248(2)

206

208

210

$V_{b\_1}$

216(1)

$V_{b\_2}$

218(1)

$V_{b\_1}$

216(2)

$V_{b\_2}$

218(2)

Station
1300(1)

Station
1300(2)

ACTIVE INDUCTOR ASSEMBLIES FOR DATA OVER POWER SYSTEMS AND ASSOCIATED METHODS

BACKGROUND

A data over power (DoP) system transmits electric power and data signals over common electrical conductors. DoP systems are used, for example, to transmit data signals between a central unit and a remote unit, as well as to electrically power the remote unit from the central unit.

DETAILED DESCRIPTION OF THE EMBODIMENTS

A data over power (DoP) system typically requires one or more magnetic devices, such as transformers or inductors, to isolate data signals from power supply circuitry and electric load circuitry. It is generally desirable that the magnetic devices have large inductance values to help ensure integrity of the data signals.

Figure 1:
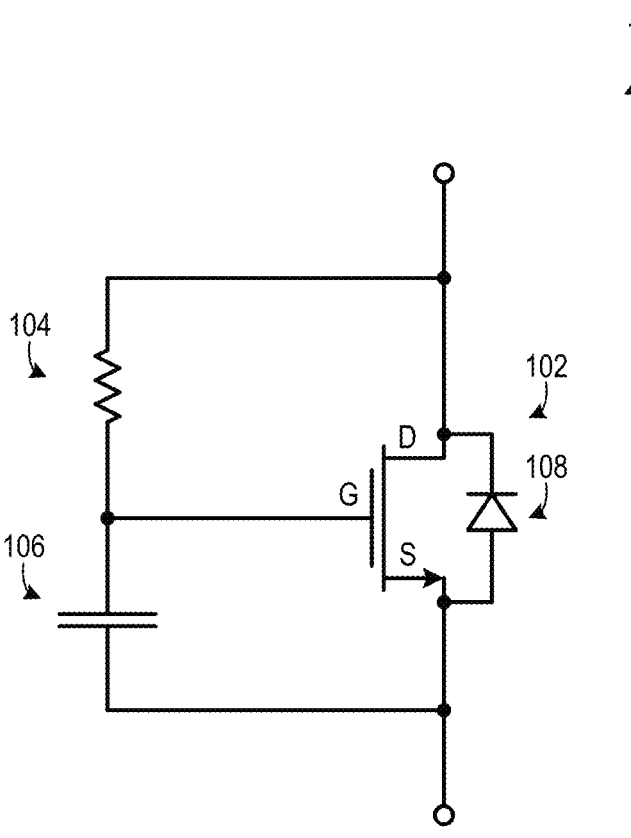
FIG. 1 is a schematic diagram of a conventional active inductor.

Magnetic devices are typically relatively large, heavy, and expensive. Electronic circuitry, on other hand, is frequently relatively small, light, and inexpensive. Therefore, it may be desirable to replace magnetic devices in a DoP system with electronic circuitry configured to emulate an inductor. Such circuitry may be referred to as an "active inductor." FIG. 1 is a schematic diagram of an active inductor 100, which is an example of a conventional active inductor. Active inductor 100 includes an enhancement mode, N-channel metal oxide semiconductor field effect transistor (NMOS FET) 102, a resistor 104, and a capacitor 106. NMOS FET 102 includes a drain D, a source S, a gate G, and a parasitic body diode 108. Resistor 104 is electrically coupled between drain D of NMOS FET 102 and gate G of NMOS FET 102. Capacitor 106 is electrically coupled between gate G of NMOS FET 102 and source S of NMOS FET 102. Active inductor 100 has an inductance L specified by EQN. 1 below, where R is resistance of resistor 104, C is capacitance of capacitor 106, and $g_m$ is transconductance of NMOS FET 102.

$$L = \frac{R \cdot C}{g_m} \qquad \text{(EQN. 1)}$$

While active inductor 100 may be smaller, lighter, and less expensive than a magnetic device, use of active inductor 100 in a DoP system may have significant drawbacks. For example, use of active inductor 100 in a DoP system may result in undesired variation in electrical bus voltage, such as due to variation in temperature of NMOS FET 102, variation in magnitude of current flowing through active inductor 100, manufacturing variation in the elements of active inductor 100, etc. Additionally, active inductor 100 requires that resistor 104 has a large resistance value, as well as that capacitor 106 has a large capacitance value, for active inductor 100 to achieve a large inductance value, which may cause active inductor 100 to be significantly susceptible to leakage current flowing to gate G of NMOS FET 102. Furthermore, use of active inductor 100 in a DoP system may undesirably limit magnitude of data signals due to presence of parasitic body diode 108.

Disclosed herein are active inductor assemblies for DoP systems and associated methods which at least partially overcome the drawbacks discussed above. The new active inductor assemblies advantageously regulate steady-state voltage drop, as well as emulate an inductor. Consequently, the new active inductor assemblies may reliably accommodate data signals with large positive and negative amplitudes, thereby promoting reliable data signal transmission and flexibility in data signal transceiver design. Additionally, the new active inductor assemblies promote energy efficiency by enabling precise control of steady-state voltage drop, which eliminates the need for large voltage drop to provide margin for possible variations in voltage drop. Furthermore, particular embodiments are configured to limit magnitude of current charging a tank capacitor of the active inductor assemblies, thereby promoting large inductance values during large signal transient operating events, such as during data transmission, while maintaining accurate regulation of steady-state voltage drop.

Figure 2:
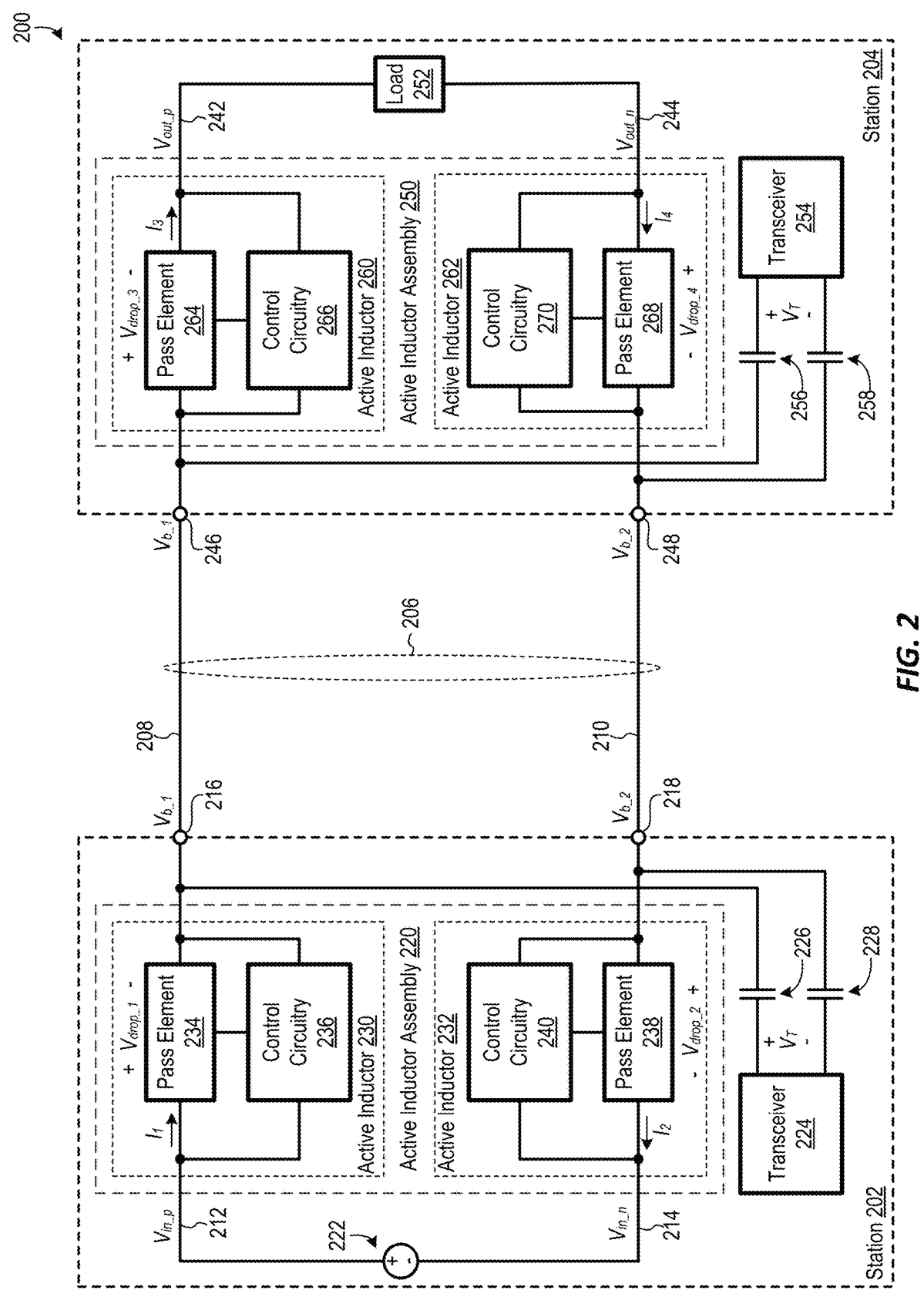
FIG. 2 is a schematic diagram of a data over power (DoP) system including two active inductor assemblies, according to an embodiment.

FIG. 2 is a schematic diagram of a DoP system 200, which is one example of a DoP system including an embodiment of the new active inductor assemblies disclosed herein. DoP system 200 includes a station 202, a station 204, and an electrical bus 206 electrically coupling station 204 to station 202. DoP system 200 is configured to transmit data signals between station 202 and station 204 via electrical bus 206. In some embodiments, DoP system 200 is configured for bidirectional data signal transmission, i.e., from station 202 to station 204 and from station 204 to station 202. In some other embodiments, DoP system 200 is configured to support only unidirectional data signal transmission, i.e., from station 202 to station 204 or from station 204 to station 202. DoP system 200 is also configured such that station 202 electrically powers station 204 via electrical bus 206.

In certain embodiments, station 202 is a central unit and station 204 is a remote unit. Applications of DoP system 200 include, but are not limited to, automotive applications and building or other premises applications. For example, in certain embodiments, station 202 is part of a control module of an automobile, and station 204 is part of a sensor or user interface of the automobile. As another example, in particular embodiments, station 202 is part of a central heating, ventilation, and air conditioning (HVAC) device, and station 204 is part of a remote HVAC device. As an additional example, in some embodiments, station 202 is part of a central communication, security, or building automation device, and station 204 is part of a remote communication, security, or building automation device. It is understood, though, that DoP system 200 is not limited to aforementioned example applications. For example, station 202 could alternately be a remote unit, and station 204 could alternatively be a central unit. As another example, station 202 and station 204 could be physically located in a common location such that neither station 202 nor station 204 is central or remote with respect to the other of station 202 and station 204.

Electrical bus 206 includes a first electrical conductor 208 and a second electrical conductor 210. In certain embodiments, first electrical conductor 208 and second electrical conductor 210 are respective wires of a twisted pair electrical cable. In some other embodiments, first electrical conductor 208 and second electrical conductor 210 are respective electrical conductors of a coaxial electrical cable. In particular other embodiments, first electrical conductor 208 and second electrical conductor 210 are respective printed circuit board (PCB) traces and/or PCB electrical planes. Additionally, first electrical conductor 208 and second electrical conductor 210 could be embodied in other manners without departing from the scope hereof. Length of electrical bus 206 may vary according to the application of DoP system 200. For example, electrical bus 206 may be relatively short if station 202 and station 204 are supported by a common PCB, and electrical bus 206 may be relatively long if station 202 and station 204 are located in different respective rooms of a building.

Station 202 includes a positive power rail 212, a negative power rail 214, a first port 216, a second port 218, an active inductor assembly 220, a power supply 222, a transceiver 224, a first data coupling capacitor 226, and a second data coupling capacitor 228. First port 216 electrically couples station 202 to first electrical conductor 208, and second port 218 electrically couples station 202 to second electrical conductor 210. In some embodiments, first port 216 and second port 218 are discrete elements, such as electrical terminals or electrical contacts, while in some other embodiments, each of first port 216 and second port 218 is a respective electrical node.

Transceiver 224 is configured to generate and/or receive a differential data signal $V_T$. For example, in some embodiments where DoP system 200 is configured for bidirectional signal transmission, transceiver 224 is configured to both generate and receive differential data signal $V_T$. As another example, in certain embodiments where DoP system 200 is configured to support only unidirectional data signal transmission, transceiver 224 is configured to solely generate differential data signal $V_T$ or to solely receive differential data signal $V_T$. First data coupling capacitor 226 is configured to electrically couple a first component of differential data signal $V_T$ between transceiver 224 and first port 216, and second data coupling capacitor 228 is configured to electrically couple a second component of differential data signal $V_T$ between transceiver 224 and second port 218.

Power supply 222 is electrically coupled between positive power rail 212 and negative power rail 214. Power supply 222 electrically biases positive power rail 212 to a voltage $V_{in\_p}$, and power supply 222 electrically biases negative power rail 214 to a voltage $V_{in\_n}$. As discussed below, power supply 222 electrically powers one or more loads of station 204. Active inductor assembly 220 includes a first active inductor 230 and a second active inductor 232. First active inductor 230 includes a pass element 234 and control circuitry 236. Pass element 234 is electrically coupled between (i) positive power rail 212 and (ii) first port 216 (and first electrical conductor 208), and control circuitry 236 is electrically coupled to each of positive power rail 212, first port 216, and pass element 234. As discussed below with respect to FIG. 13, in some alternate embodiments, pass element 234 and control circuitry 236 are electrically coupled to first port 216 via current control circuitry, such as one or more diodes or electronic circuitry emulating one or more diodes.

Pass element 234 includes, for example, one or more transistors, such as field effect transistors or bipolar junction transistors, configured to operate as a variable resistor under the control of control circuitry 236. Specifically, control circuitry 236 is configured to control pass element 234 such that a voltage drop $V_{drop\_1}$ across pass element 234 conforms to EQN. 2 below, where $I_1$ is current flowing through pass element 234, $V_{reg\_1}$ is a predetermined value, t is time, and $L_1$ is inductance exhibited by active inductor 230. As such, control circuitry 236 is configured to control pass element 234 such that (i) pass element 234 regulates voltage $V_{drop\_1}$ to predetermined value $V_{reg\_1}$ during steady-state operation of first active inductor 230 and (ii) pass element 234 emulates an inductor having an inductance $L_1$ in response to change in voltage $V_{drop\_1}$ across pass element 234. In this document, steady-state operation of an active inductor means that magnitude of voltage $V_{drop}$ across a pass element of the active inductor is constant, such as when DoP system 200 is not transmitting differential data signal $V_T$ via electrical bus 206. For example, steady-state operation of active inductor 230 is characterized by magnitude of voltage $V_{drop1}$ being constant. As discussed below, $V_{reg\_1}$ is selected according to anticipated magnitude of data signals on electrical bus 206. Particular embodiments of active inductor 230 are configured such that inductance $L_1$ exhibited by active inductor 230 is boosted during large signal transient events in DoP system 200, such as when DoP system 200 is transmitting differential data signal $V_T$ via electrical bus 206. As such, in these embodiments, the value of inductance $L_1$ is greater when DoP system 200 is transmitting differential data signal $V_T$ via electrical bus 206 than when DoP system 200 is not transmitting differential data signal $V_T$ via electrical bus 206.

$$V_{drop\_1} = V_{reg\_1} + L_1 \cdot \frac{d(I_1)}{dt} \qquad \text{(EQN. 2)}$$

Second active inductor 232 includes a pass element 238 and control circuitry 240. Pass element 238 is electrically coupled between (i) negative power rail 214 and (ii) second port 218 (and second electrical conductor 210), and control circuitry 240 is electrically coupled to each of negative power rail 214, second port 218, and pass element 238. Pass element 238 includes, for example, one or more transistors, such as field effect transistors or bipolar junction transistors, configured to operate as a variable resistor under the control of control circuitry 240. Specifically, control circuitry 240 is configured to control pass element 238 such that a voltage drop $V_{drop\_2}$ across pass element 238 conforms to EQN. 3 below, where $I_2$ is current flowing through pass element 238, voltage $V_{reg\_2}$ is a predetermined value, t is time, and $L_2$ is inductance exhibited by active inductor 232. As such, control circuitry 240 is configured to control pass element 238 such that (i) pass element 238 regulates voltage $V_{drop\_2}$ to predetermined value $V_{reg\_2}$ during steady-state operation of second active inductor 232 and (ii) pass element 238 emulates an inductor having an inductance $L_2$ in response to change in voltage $V_{drop\_2}$ pass element 238. In some embodiments of active inductor assembly 220, each of control circuitry 236 and control circuitry 240 is configured such that each of voltage $V_{reg\_1}$ and voltage $V_{reg\_2}$ is a common predetermined value that is selected according to anticipated magnitude of data signals on electrical bus 206. Particular embodiments of active inductor 232 are configured such that inductance $L_2$ exhibited by active inductor 232 is boosted during large signal transient events in DoP system 200, such as when DoP system 200 is transmitting differential data signal $V_T$ via electrical bus 206. As such, in these embodiments, the value of inductance $L_2$ is greater when DoP system 200 is transmitting differential data signal $V_T$ via electrical bus 206 than when DoP system 200 is not transmitting differential data signal $V_T$ via electrical bus 206.

$$V_{drop\_2} = V_{reg\_2} + L_2 \cdot \frac{d(I_2)}{dt} \qquad \text{(EQN. 3)}$$

Figure 3:
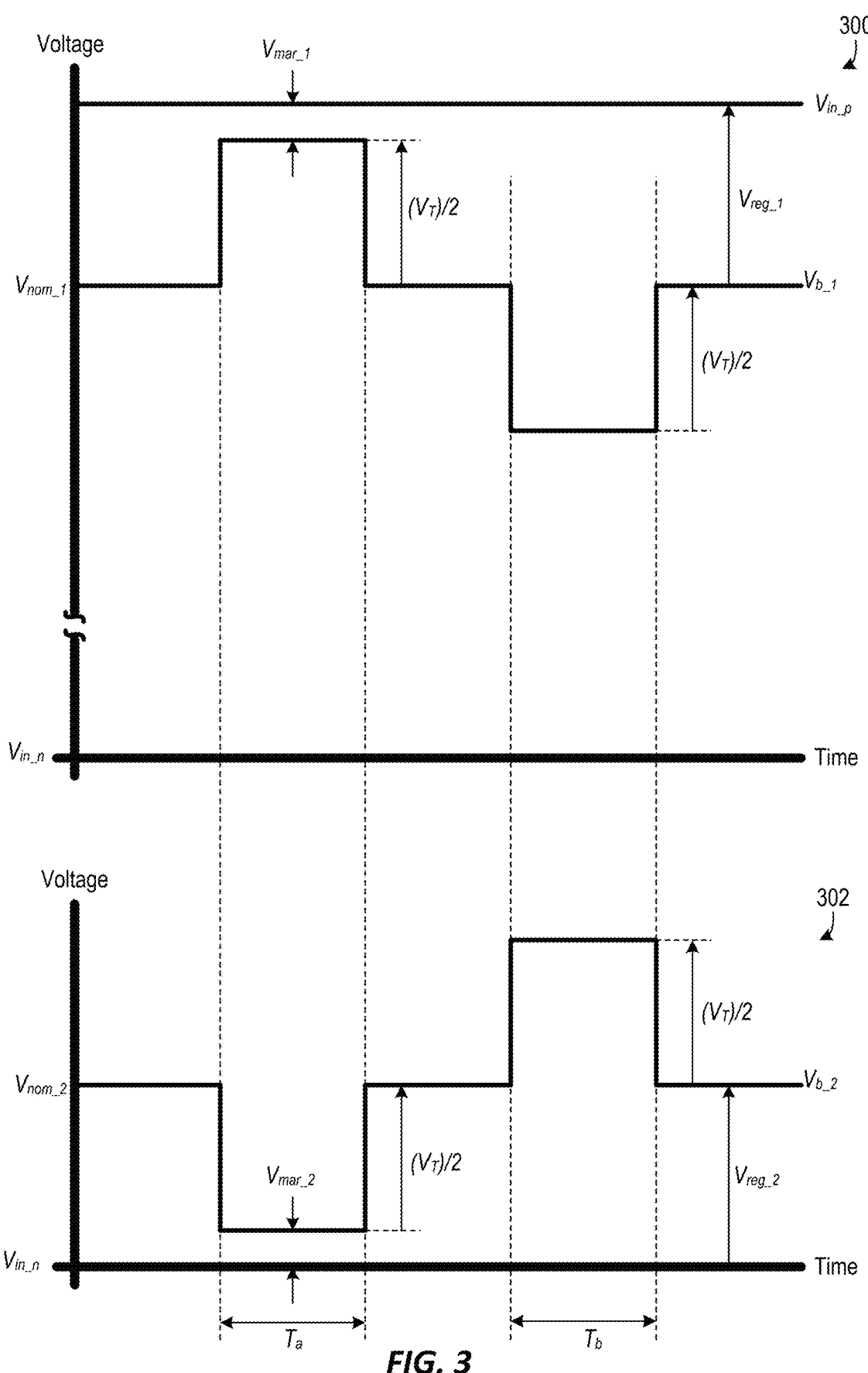
FIG. 3 includes two graphs collectively illustrating one example of operation of a first station of the FIG. 2 DoP system.

FIG. 3 includes a graph 300 and a graph 302 collectively illustrating one example of operation of station 202. It is understood, though, that station 202 is not limited to operating according to the example of FIG. 3. Graph 300 and graph 302 are of voltage versus and time, and graph 300 and graph 302 share a common time base. Graph 300 includes a curve representing voltage $V_{in\_p}$ on positive power rail 212 as well as a curve representing a voltage $V_{b\_1}$ on first electrical conductor 208. Graph 302 includes a curve representing a voltage $V_{b\_2}$ on second electrical conductor 210. A nominal value $V_{nom\_1}$ of voltage $V_{b\_1}$ is equal to $V_{in\_p}$ – $V_{reg\_1}$, and a nominal value $V_{nom\_2}$ of voltage $V_{b\_2}$ is equal to $V_{in\_n}$ + $V_{reg\_2}$. Each of $V_{reg\_1}$ and $V_{reg\_2}$ has a common magnitude in the FIG. 3 example.

Differential data signal $V_T$ is asserted in a positive manner during a time period $T_a$, which is characterized by (i) increasing magnitude of voltage $V_{b\_1}$ on first electrical conductor 208 by a value $V_T/2$ and (ii) decreasing magnitude of voltage $V_{b\_2}$ on second electrical conductor 210 by value $V_T/2$. Differential data signal $V_T$ is asserted in a negative manner during a time period Tb, which is characterized by (i) decreasing magnitude of voltage $V_{b\_1}$ on first electrical conductor 208 by value $V_T/2$ and (ii) increasing magnitude of voltage $V_{b\_2}$ on second electrical conductor 210 by value $V_T/2$. It should be noted that magnitude of voltage $V_{reg\_1}$ is greater than peak magnitude $V_T/2$ of differential data signal $V_T$ on first electrical conductor 208 by a margin of $V_{mar\_1}$ to ensure that there is sufficient headroom for the differential data signal $V_T$ on first electrical conductor 208. Similarly, magnitude of voltage $V_{reg\_2}$ is greater than peak magnitude $V_T/2$ of differential data signal $V_T$ on second electrical conductor 210 by a margin of $V_{mar\_2}$ to ensure that there is sufficient headroom for differential data signal $V_T$ on second electrical conductor 210. However, the fact that pass element 234 and pass element 238 regulate steady-state values of voltage $V_{drop\_1}$ and voltage $V_{drop\_2}$, respectively, enables each margin $V_{mar\_1}$ and margin $V_{mar\_2}$ to be small, while still ensuring signal integrity on electrical bus 206. Small values of margin $V_{mar\_1}$ and margin $V_{mar\_2}$ help minimize power dissipation in pass element 234 and pass element 238, respectively, thereby promoting energy efficiency of DoP system 200.

Referring again to FIG. 2, station 204 includes a positive power rail 242, a negative power rail 244, a first port 246, a second port 248, an active inductor assembly 250, a load 252, a transceiver 254, a first data coupling capacitor 256, and a second data coupling capacitor 258. First port 246 electrically couples station 204 to first electrical conductor 208, and second port 248 electrically couples station 204 to second electrical conductor 210. In some embodiments, first port 246 and second port 248 are discrete elements, such as electrical terminals or electrical contacts, while in some other embodiments, each of first port 246 and second port 248 is a respective electrical node.

Transceiver 254 is configured to generate and/or receive differential data signal $V_T$. In some embodiments where DoP system 200 is configured for bidirectional signal transmission, transceiver 254 is configured to both generate and receive differential data signal $V_T$. As another example, in certain embodiments where DoP system 200 is configured to support only unidirectional data signal transmission, transceiver 254 is configured to solely generate differential data signal $V_T$ or to solely receive differential data signal $V_T$. First data coupling capacitor 256 is configured to electrically couple a first component of differential data signal $V_T$ between transceiver 254 and first port 246, and second data coupling capacitor 258 is configured to electrically couple a second component of differential data signal $V_T$ between transceiver 254 and second port 248.

Load 252 is electrically coupled between positive power rail 242 and negative power rail 244. In some embodiments, load 252 includes capacitance (not shown) as well as circuitry which consumes electric power. Power supply 222 of station 202 electrically biases positive power rail 242 to a voltage $V_{out\_p}$ via active inductor 230, first electrical conductor 208, and a first active inductor 260 (discussed below) of active inductor assembly 250. Additionally, power supply 222 of station 202 electrically biases negative power rail 244 to a voltage $V_{out\_n}$ via active inductor 232, second electrical conductor 210, and a second active inductor 262 (discussed below) of active inductor assembly 250. As such, load 252 is electrically powered by power supply 222 of station 202.

Active inductor assembly 250 includes first active inductor 260 and second active inductor 262. First active inductor 260 includes a pass element 264 and control circuitry 266. Pass element 264 is electrically coupled between first port 246 and positive power rail 242, and control circuitry 266 is electrically coupled to each of first port 246, positive power rail 242, and pass element 264. As discussed below with respect to FIG. 16, in some alternate embodiments, pass element 264 and control circuitry 266 are electrically coupled to first port 246 via a bridge rectifier.

Pass element 264 includes, for example, one or more transistors, such as field effect transistors or bipolar junction transistors, configured to operate as a variable resistor under the control of control circuitry 266. Specifically, control circuitry 266 is configured to control pass element 264 such that a voltage drop $V_{drop\_3}$ across pass element 264 conforms to EQN. 4 below, where $I_3$ is current flowing through pass element 264, voltage $V_{reg\_3}$ is a predetermined value, t is time, and $L_3$ is inductance exhibited by active inductor 260. As such, control circuitry 266 is configured to control pass element 264 such that (i) pass element 264 regulates voltage $V_{drop\_3}$ to predetermined value $V_{reg\_3}$ during steadstate operation of active inductor 260 and (ii) pass element 264 emulates an inductor having an inductance $L_3$ in response to change in voltage $V_{drop\_3}$ across pass element 264. As discussed below, $V_{reg\_3}$ is selected according to anticipated magnitude of data signals on electrical bus 206. Particular embodiments of active inductor 260 are configured such that inductance $L_3$ exhibited by active inductor 260 is boosted during large signal transient events in DoP system 200, such as when DoP system 200 is transmitting differential data signal $V_T$ via electrical bus 206. As such, in these embodiments, the value of inductance $L_3$ is greater when DoP system 200 is transmitting differential data signal $V_T$ via electrical bus 206 than when DoP system 200 is not transmitting differential data signal $V_T$ via electrical bus 206.

$$V_{drop\_3} = V_{reg\_3} + L_3 \cdot \frac{d(I_3)}{dt} \qquad \text{(EQN. 4)}$$

Second active inductor 262 includes a pass element 268 and control circuitry 270. Pass element 268 is electrically coupled between second port 248 and negative power rail 244, and control circuitry 270 is electrically coupled to each of second port 248, negative power rail 244, and pass element 268. As discussed below with respect to FIG. 16, in some alternate embodiments, pass element 268 and control circuitry 270 are electrically coupled to second port 248 via a bridge rectifier.

Pass element 268 includes, for example, one or more transistors, such as field effect transistors or bipolar junction transistors, configured to operate as a variable resistor under the control of control circuitry 270. Specifically, control circuitry 270 is configured to control pass element 268 such that a voltage drop $V_{drop\_4}$ across pass element 268 conforms to EQN. 5 below, where $I_4$ is current flowing through pass element 268, voltage $V_{reg\_4}$ is a predetermined steadystate value, t is time, and $L_4$ is inductance exhibited by active inductor 262. As such, control circuitry 270 is configured to control pass element 268 such that (i) pass element 268 regulates voltage $V_{drop\_4}$ to predetermined value $V_{reg\_4}$ during steady-state operation of second active inductor 262 and (ii) pass element 268 emulates an inductor having an inductance $L_4$ in response to change in voltage $V_{drop\_4}$ across pass element 268. In some embodiments of active inductor assembly 250, control circuitry 266 and control circuitry 270 are configured such that each of voltage $V_{reg\_3}$ and voltage $V_{reg\_4}$ is a common predetermined value that is selected according to anticipated magnitude of data signals on electrical bus 206. Particular embodiments of active inductor 262 are configured such that inductance $L_4$ exhibited by active inductor 262 is boosted during large signal transient events in DoP system 200, such as when DoP system 200 is transmitting differential data signal $V_T$ via electrical bus 206. As such, in these embodiments, the value of inductance $L_4$ is greater when DoP system 200 is transmitting differential data signal $V_T$ via electrical bus 206 than when DoP system 200 is not transmitting differential data signal $V_T$ via electrical bus 206.

$$V_{drop\_4} = V_{reg\_4} + L_4 \cdot \frac{d(I_4)}{dt} \qquad \text{(EQN. 5)}$$

Figure 4:
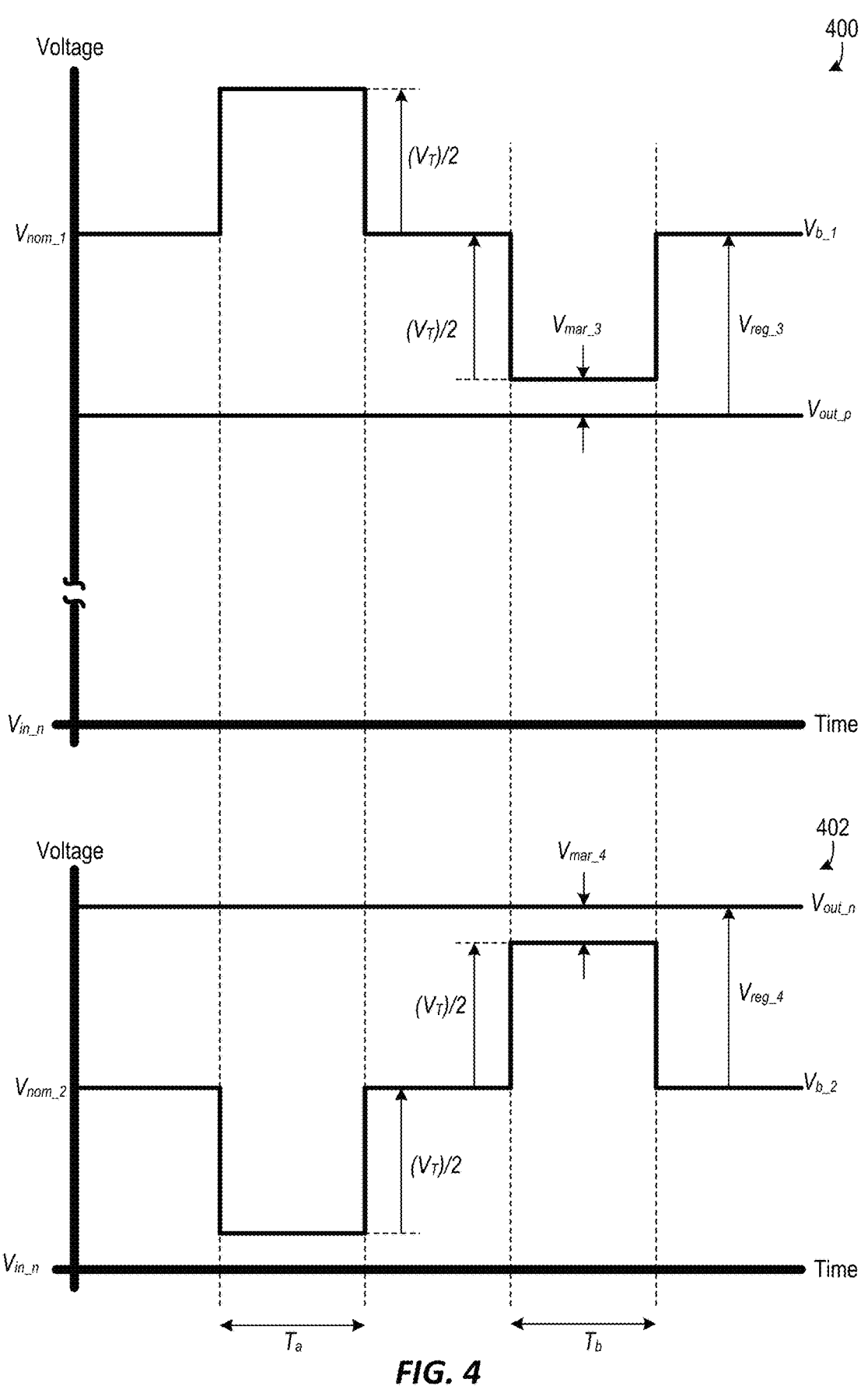
FIG. 4 includes two graphs collectively illustrating one example of operation of a second station of the FIG. 2 DoP system.

FIG. 4 includes a graph 400 and a graph 402 collectively illustrating one example of operation of station 204. It is understood, though, that station 204 is not limited to operating according to the example of FIG. 4. Graph 400 and graph 402 are of voltage versus and time, and graph 400 and graph 402 share a common time base. Graph 400 includes a curve representing voltage $V_{out\_p}$ on positive power rail 242 as well as a curve representing voltage $V_{b\_1}$ on first electrical conductor 208. Graph 402 includes a curve representing voltage $V_{out\_n}$ on negative power rail 244 as well as a curve representing voltage $V_{b\_2}$ on second electrical conductor 210. Nominal value $V_{nom\_1}$ of voltage $V_{b\_1}$ is equal to $V_{out\_p} + V_{reg\_3}$, and nominal value $V_{nom\_2}$ of voltage $V_{b\_2}$ is equal to $V_{out\_n} - V_{reg\_4}$. Each of $V_{reg\_3}$ and $V_{reg\_4}$ has a common magnitude in the FIG. 4 example, and $V_{reg\_1} = V_{reg\_2} = V_{reg\_3} = V_{reg\_4}$ in the examples of FIGS. 3 and 4.

FIG. 4 includes time periods $T_a$, and Tb as discussed above with respect to FIG. 3. Magnitude of voltage $V_{reg\_3}$ is greater than peak magnitude $V_T/2$ of differential data signal $V_t$ pulses on first electrical conductor 208 by a margin of $V_{mar\_3}$ to ensure that there is sufficient headroom for differential data signal $V_T$ on first electrical conductor 208. Similarly, magnitude of voltage $V_{ref\_4}$ is greater than peak magnitude $V_T/2$ of data signal $V_T$ pulses on second electrical conductor 210 by a margin of $V_{mar\_4}$ to ensure that there is sufficient headroom for the differential data signal $V_T$ on second electrical conductor 210. In a manner similar to that discussed above with respect to FIG. 3, the fact that pass element 264 and pass element 268 regulate steady-state values of voltage $V_{drop\_3}$ and voltage $V_{drop\_4}$, respectively, enables margin $V_{mar\_3}$ and margin $V_{mar\_4}$ to be small, while still ensuring signal integrity on electrical bus 206. Small values of margin $V_{mar\_3}$ and margin $V_{mar\_4}$ help minimize power dissipation in pass element 264 and pass element 268, respectively, thereby promoting energy efficiency of DoP system 200.

Discussed below with respect to FIGS. 5-12 are example embodiments of the active inductors disclosed herein. However, it is understood that active inductors disclosed herein could be embodied in other manners without departing from the scope hereof.

Figure 5:
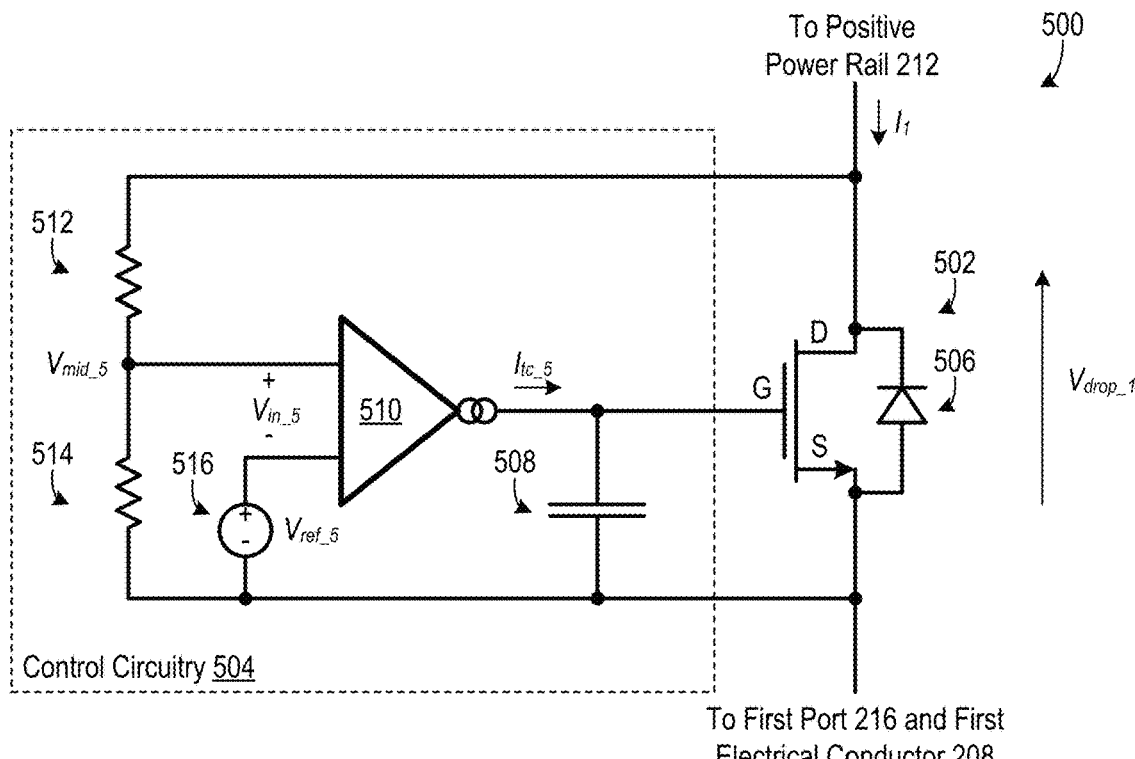
FIG. 5 is a schematic diagram of one embodiment of a first active inductor of the first station of the FIG. 2 DoP system.

FIG. 5 is a schematic diagram of an active inductor 500, where active inductor 500 is one possible embodiment of active inductor 230 of FIG. 2. Active inductor 500 includes an NMOS FET 502 and control circuitry 504, where NMOS FET 502 is an embodiment of pass element 234 and control circuitry 504 is an embodiment of control circuitry 236. NMOS FET 502 includes a drain D, a source S, a gate G, and a parasitic body diode 506. Drain D of NMOS FET 502 is electrically coupled to positive power rail 212, and source S of NMOS FET 502 is electrically coupled to first port 216 and first electrical conductor 208. Control circuitry 504 includes a tank capacitor 508, a transconductance amplifier 510, a resistor 512, a resistor 514, and a reference voltage source 516. Tank capacitor 508 is electrically coupled between gate G and source S of NMOS FET 502. Resistor 512 and resistor 514 are electrically coupled in series between drain D and source S of NMOS FET 502. Reference voltage source 516 is referenced to source S of NMOS FET 502, and reference voltage source 516 generates a reference voltage $V_{ref\_5}$. Transconductance amplifier 510 is configured to generate an output current $It_{c\_5}$ proportional to an input voltage $V_{in\_5}$ of transconductance amplifier 510, where input voltage $V_{in\_5}$ is equal to a difference between a voltage $V_{mid\_5}$ and reference voltage $V_{ref\_5}$. Voltage $V_{mid\_5}$ is a voltage at a voltage divider mid-point between resistor 512 and resistor 514, and voltage $V_{mid\_5}$ is accordingly associated with voltage $V_{drop\_1}$. Transconductance amplifier 510 drives each of gate G of NMOS FET 502 and tank capacitor 508 via output current $It_{c\_5}$ of transconductance amplifier 510, to control NMOS FET 502.

NMOS FET 502 regulates magnitude of voltage $V_{drop\_1}$ under the control of control circuitry 504 to predetermined value $V_{reg\_1}$ during steady-state operation of first active inductor 500 according to EQN. 6 below, where $R_{512}$ is resistance of resistor 512 and $R_{514}$ is resistance of resistor 514. Therefore, magnitude of voltage $V_{reg\_1}$ can be adjusted during the design of active inductor 500 by varying one or more of $R_{512}$, $R_{514}$, and $V_{ref\_5}$. Additionally, control circuitry 504 controls NMOS FET 502 such that active inductor 500 exhibits effective inductance $L_1$ in response to change in voltage $V_{drop\_1}$ across NMOS FET 502. Inductance $L_1$ exhibited by active inductor 500 is given by EQN. 7 below, where $g_{m\_ota5}$ is transconductance of transconductance amplifier 510, $g_{m\_FET5}$ is transconductance of NMOS FET 502, $C_{508}$ is capacitance of tank capacitor 508, and $K_5$ is a scaling factor that is equal to $R_{514}/(R_{512}+R_{514})$. The product of $g_{m\_ota5}$ and $K_5$ may be considered a gain of transconductance amplifier 510, and $g_{m\_FET5}$ may be considered a gain of NMOS FET 502.

$$V_{reg\_1} = V_{ref\_5} \cdot \frac{(R_{512} + R_{514})}{R_{514}} \qquad \text{(EQN. 6)}$$

$$L_1 = \frac{C_{508}}{K_5 \cdot g_{m\_ota5} \cdot g_{m\_FET5}} \qquad \text{(EQN. 7)}$$

As evident from EQN. 7, inductance is inversely proportional to each of gain of transconductance amplifier 510 and gain of NMOS FET 502. Therefore, it is desirable for gain of transconductance amplifier 510 to be small to achieve large inductance of active inductor 500, as large inductance of active inductors in DoP system 200 helps maintain constant magnitude of current flowing through the active inductors, which promotes integrity of data communication signals on electrical bus 206 by minimizing need for current to flow through coupling capacitors to compensate for change in magnitude of current flowing through the active inductors. On the other hand, it is desirable for gain of transconductance amplifier 510 to be large to reduce susceptibility of active inductor 500 to leakage current flowing to gate G of NMOS FET 502 and thereby realize tight regulation of voltage $V_{reg\_1}$. Applicant has found that the conflict between these two goals can be overcome by (i) setting gain of transconductance amplifier 510 (product of $K_5$ and $g_{m\_ota5}$) to a relatively high value and (ii) limiting magnitude of output current $It_{c\_5}$ to a predetermined saturation value $I_{sat\_5}$. Setting gain of transconductance amplifier 510 to a relatively high value promotes immunity to leakage current flowing into gate G of NMOS FET 502 and corresponding precise regulation of magnitude of voltage $V_{drop\_1}$ during steady-state operation of first active inductor 500. Additionally, limiting magnitude of current $It_{c\_5}$ to saturation value $I_{sat\_5}$ limits rate of change of voltage across tank capacitor 508 during a large signal transient event, such as during transmission of differential data signal $V_T$ via electrical bus 206, which increases effective inductance of first active inductor 500 during the large signal transient event.

For example, consider an embodiment of active inductor 500 where (i) tank capacitor 508 has a capacitance of 100 nanofarads, gain ($g_{m\_FET5}$) of NMOS FET 502 is 5 amperes per volt, gain (product of $K_5$ and $g_{m\_ota5}$) of transconductance amplifier 510 is 6 microamperes per volt, and predetermined saturation value $I_{sat\_5}$ is 4 microamperes. In this embodiment, inductance $L_1$ is equal to 3.33 millihenrys (mH) as determined from EQN. 7, but inductance $L_1$ is boosted to 12.5 mH during a large signal transient event in the form of a 2.5 volt pulse applied to first port 216.

Accordingly, particular embodiments of transconductance amplifier 510 are configured such that saturation current value $I_{sat\_5}$ is defined according to EQN. 8 below. For example, in certain embodiments, saturation current value $I_{sat\_5}$ is less than 50 percent of the product of $V_T/2$, $g_{m\_ota5}$, and $K_5$. As another example, in particular embodiments, saturation current value $I_{sat\_5}$ is less than 10 percent of the product of $V_T/2$, $g_{m\_ota5}$, and $K_5$. As a further example, in some embodiments, saturation current value $I_{sat\_5}$ is less than one percent of the product of $V_T/2$, $g_{m\_ota5}$, and $K_5$.

$$I_{sat\_5} \ll \frac{V_T}{2} \cdot g_{m\_ota5} \cdot K_5 \qquad \text{(EQN. 8)}$$

Figure 6:
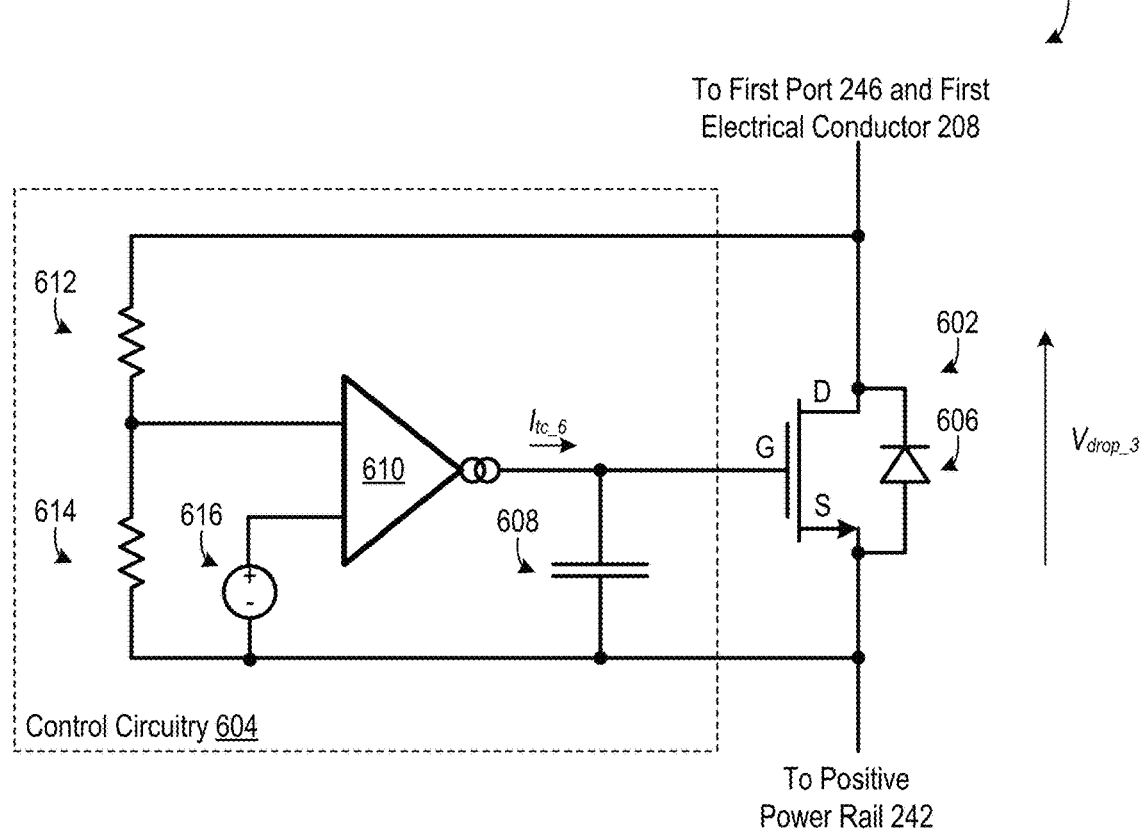
FIG. 6 is a schematic diagram of one embodiment of a first active inductor of the second station of the FIG. 2 DoP system.

Active inductor 260 of station 204 could be embodied in a manner similar to active inductor 500. For example, FIG. 6 is a schematic diagram of an active inductor 600, which is one possible embodiment of active inductor 260 of station 204. Active inductor 600 includes an NMOS FET 602 and control circuitry 604 which are analogous to NMOS FET 502 and control circuitry 504, respectively. NMOS FET 602 is an embodiment of pass element 264 and control circuitry 604 is an embodiment of control circuitry 266. NMOS FET 602 includes a drain D, a source S, a gate G, and a parasitic body diode 606. Drain D of NMOS FET 602 is electrically coupled to first port 246 and first electrical conductor 208, and source S of NMOS FET 602 is electrically coupled to positive power rail 212. Control circuitry 604 includes a tank capacitor 608, a transconductance amplifier 610, a resistor 612, a resistor 614, and a reference voltage source 616, which are analogous to tank capacitor 508, transconductance amplifier 510, resistor 512, resistor 514, and reference voltage source 516, respectively. Active inductor 600 accordingly operates in a manner analogous to that of active inductor 500. For example, active inductor 600 operates in a manner analogous to active inductor 500 to regulate magnitude of voltage $V_{drop\_3}$ to predetermined value $V_{reg\_3}$ during steady-state operation of active inductor 600. Additionally, active inductor 600 operates in a manner analogous to active inductor 500 to exhibit an inductance of $L_3$ in response to dynamic current flowing through NMOS FET 602. Furthermore, some embodiments of active inductor 600 are configured to limit magnitude of an output current $I_{tc\_6}$ generated by transconductance amplifier 610 to a predetermined saturation value $I_{sat\_6}$ to boost effective inductance exhibited by active inductor 600 during a large signal transient event, such as during transmission of differential data signal $V_T$ via electrical bus 206.

Figure 7:
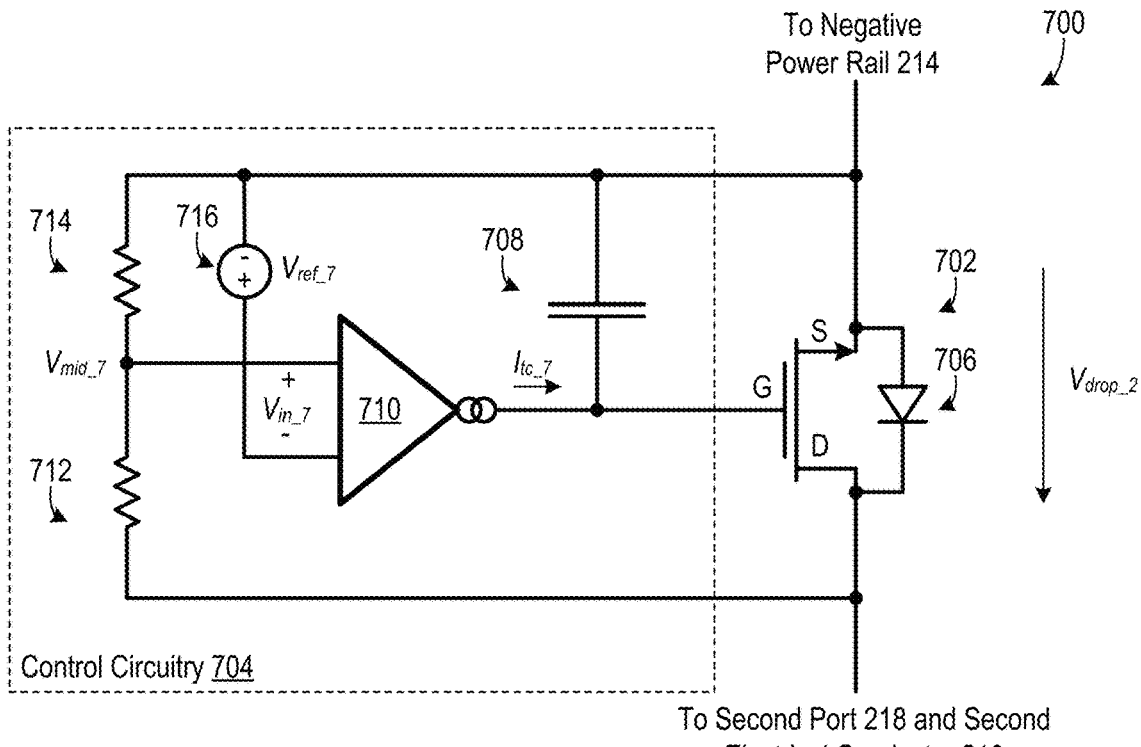
FIG. 7 is a schematic diagram of one embodiment of a second active inductor of the first station of the FIG. 2 DoP system.

FIG. 7 is a schematic diagram of an active inductor 700, where active inductor 700 is one possible embodiment of active inductor 232 of FIG. 2. Active inductor 700 includes an NMOS FET 702 and control circuitry 704, where NMOS FET 702 is an embodiment of pass element 238 and control circuitry 704 is an embodiment of control circuitry 240. NMOS FET 702 includes a drain D, a source S, a gate G, and a parasitic body diode 706. Drain D of NMOS FET 702 is electrically coupled to second port 218 and second electrical conductor 210, and source S of NMOS FET 702 is electrically coupled to negative power rail 214. Control circuitry 704 includes a tank capacitor 708, a transconductance amplifier 710, a resistor 712, a resistor 714, and a reference voltage source 716. Tank capacitor 708 is electrically coupled between gate G and source S of NMOS FET 702. Resistor 712 and resistor 714 are electrically coupled in series between drain D and source S of NMOS FET 702. Reference voltage source 716 is referenced to source S of NMOS FET 702, and reference voltage source 716 generates a reference voltage $V_r f 7$. Transconductance amplifier 710 is configured to generate an output current $It_{c\_7}$ proportional to an input voltage $V_{in\_7}$ of transconductance amplifier 710, where input voltage $V_{in\_7}$ is equal to a difference between a voltage $V_{mid\_7}$ and a reference voltage $V_{ref\_7}$. Voltage $V_{mid\_7}$ is a voltage at a voltage divider mid-point between resistor 712 and resistor 714, and voltage $V_{mid\_7}$ is accordingly associated with voltage $V_{drop\_2}$. Transconductance amplifier 710 drives each of gate G of NMOS FET 702 and tank capacitor 708 via output current $It_{c\_7}$ of transconductance amplifier 710, to control NMOS FET 702.

NMOS FET 702 regulates magnitude of voltage $V_{drop\_2}$ under the control of control circuitry 704 to predetermined value $V_{reg\_2}$ during steady-state operation of active inductor 700 according to EQN. 9 below, where $R_{712}$ is resistance of resistor 712 and $R_{714}$ is resistance of resistor 714. Therefore, magnitude of voltage $V_{reg\_2}$ can be adjusted during the design of active inductor 700 by varying one or more of $R_{712}$, $R_{714}$, and $V_{ref\_7}$. Additionally, control circuitry 704 controls NMOS FET 702 such that active inductor 700 exhibits an effective inductance of $L_2$ in response to change in voltage $V_{drop\_2}$ across NMOS FET 702. Inductance $L_2$ exhibited by active inductor 700 is given by EQN. 10 below, where $g_{m\_ota7}$ is transconductance of transconductance amplifier 710, $g_{m\_FET7}$ is transconductance of NMOS FET 702, $C_{708}$ is capacitance of tank capacitor 708, and $K_7$ is a scaling factor that is equal to $R_{714}/(R_{712}+R_{714})$. Furthermore, in particular embodiments of active inductor 700, control circuitry 704 is configured such that (i) gain of transconductance amplifier 710 (product of $K_7$ and $g_{m\_ota7}$) is set to a relatively high value and (ii) magnitude of output current $It_{c\_7}$ is limited to a predetermined saturation current value $I_{sat\_7}$, where saturation current value $I_{sat\_7}$ is defined according to EQN. 11 below, for reasons analogous to those discussed above with respect to active inductor 500. For example, in certain embodiments, saturation current value $I_{sat\_7}$ is less than 50 percent of the product of $V_T/2$, $g_{m\_ota7}$, and $K_7$. As another example, in particular embodiments, saturation current value $I_{sat\_7}$ is less than 10 percent of the product of $V_T/2$, $g_{m\_ota7}$, and $K_7$. As a further example, in some embodiments, saturation current value $I_{sat\_7}$ is less than one percent of the product of $V_T/2$, $g_{m\_ota7}$, and $K_7$.

$$V_{reg\_2} = V_{ref\_7} \cdot \frac{(R_{712} + R_{714})}{R_{714}} \qquad \text{(EQN. 9)}$$

$$L_2 = \frac{C_{708}}{K_7 \cdot g_{m\_ota7} \cdot g_{m\_FET7}} \qquad \text{(EQN. 10)}$$

$$I_{sat\_7} \ll \frac{V_T}{2} \cdot g_{m\_ota7} \cdot K_7 \qquad \text{(EQN. 11)}$$

Figure 8:
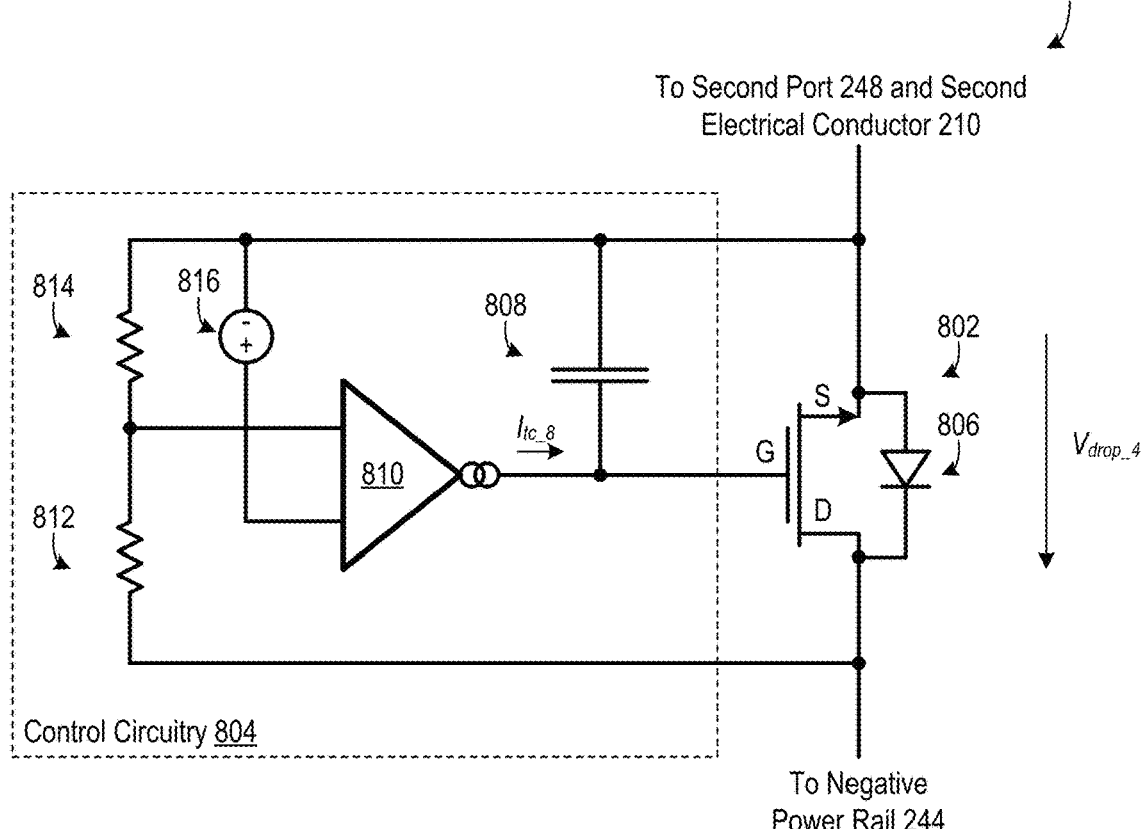
FIG. 8 is a schematic diagram of one embodiment of a second active inductor of the second station of the FIG. 2 DoP system.

Active inductor 262 of station 204 could be embodied in a manner similar to active inductor 700. For example, FIG. 8 is a schematic diagram of an active inductor 800, which is one possible embodiment of active inductor 262 of station 204. Active inductor 800 includes an NMOS FET 802 and control circuitry 804, which are analogous to NMOS FET 702 and control circuitry 704, respectively. NMOS FET 802 is an embodiment of pass element 268, and control circuitry 804 is an embodiment of control circuitry 270. Drain D of NMOS FET 802 is electrically coupled to negative power rail 244, and source S of NMOS FET 802 is electrically coupled to second port 248 and second electrical conductor 210. Control circuitry 804 includes a tank capacitor 808, a transconductance amplifier 810, a resistor 812, a resistor 814, and a reference voltage source 816 which are analogous to tank capacitor 708, transconductance amplifier 710, resistor 712, resistor 714, and reference voltage source 716, respectively. Active inductor 800 accordingly operates in a manner analogous to that of active inductor 700. For example, active inductor 800 operates in a manner analogous to active inductor 700 to regulate magnitude of voltage $V_{drop\_4}$ to predetermined value $V_{reg\_4}$ during steady-state operation of active inductor 800. Additionally, active inductor 800 operates in a manner analogous to active inductor 700 to exhibit an inductance of $L_4$ in response to change in voltage $V_{drop\_4}$ across NMOS FET 802. Furthermore, some embodiments of active inductor 800 are configured to limit magnitude of an output current $I_{tc\_8}$ generated by transconductance amplifier 810 to a predetermined saturation value $I_{sat\_8}$ to boost effective inductance exhibited by active inductor 800 during a large signal transient event, such as during transmission of differential data signal $V_T$ via electrical bus 206.

Figure 9:
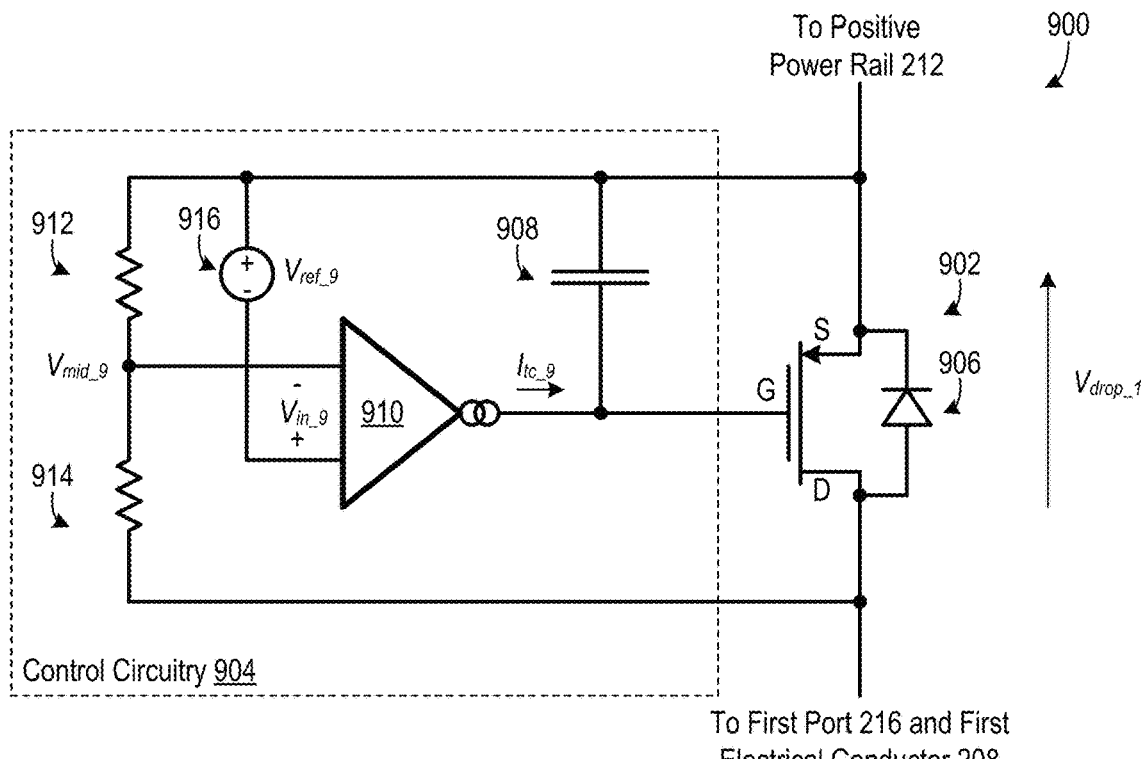
FIG. 9 is a schematic diagram of another embodiment of the first active inductor of the first station of the FIG. 2 DoP system.

FIG. 9 is a schematic diagram of an active inductor 900, where active inductor 900 is another possible embodiment of active inductor 230 of FIG. 2. Active inductor 900 includes an enhancement mode, P-channel metal oxide semiconductor field effect transistor (PMOS FET) 902 and control circuitry 904, where PMOS FET 902 is an embodiment of pass element 234 and control circuitry 904 is an embodiment of control circuitry 236. PMOS FET 902 includes a drain D, a source S, a gate G, and a parasitic body diode 906. Source S of PMOS FET 902 is electrically coupled to positive power rail 212, and drain D of PMOS FET 902 is electrically coupled to first port 216 and first electrical conductor 208. Control circuitry 904 includes a tank capacitor 908, a transconductance amplifier 910, a resistor 912, a resistor 914, and a reference voltage source 916. Tank capacitor 908 is electrically coupled between gate G and source S of PMOS FET 902. Reference voltage source 916 is referenced to source S of PMOS FET 902, and reference voltage source 916 generates a reference voltage $V_{ref\_9}$. Resistor 912 and resistor 914 are electrically coupled in series between source S and drain D of PMOS FET 902. Transconductance amplifier 910 is configured to generate an output current $It_{c\_9}$ proportional to an input voltage $V_{in\_9}$ of transconductance amplifier 910, where input voltage $V_{in\_9}$ is equal to a difference between a reference voltage $V_{ref\_9}$ and a voltage $V_{mid\_9}$. Voltage $V_{mid\_9}$ is a voltage at a voltage divider mid-point between resistor 912 and resistor 914, and voltage $V_{mid\_9}$ is accordingly associated with voltage $V_{drop\_1}$. Transconductance amplifier 910 drives each of gate G of PMOS FET 902 and tank capacitor 908 via output current $It_{c\_9}$ of transconductance amplifier 910, to control PMOS FET 902.

PMOS FET 902 regulates magnitude of voltage $V_{drop\_1}$ under the control of control circuitry 904 to predetermined value $V_{reg\_1}$ during steady-state operation of active inductor 900 according to EQN. 12 below, where $R_{912}$ is resistance of resistor 912 and $R_{914}$ is resistance of resistor 914. Therefore, magnitude of voltage $V_{reg\_1}$ can be adjusted during the design of active inductor 900 by varying one or more of $R_{912}$, $R_{914}$, and $V_{r}ef$ 9. Additionally, control circuitry 904 controls PMOS FET 902 such that active inductor 900 exhibits an effective inductance of $L_1$ in response to change in voltage across $V_{drop\_1}$ across PMOS FET 902. Inductance $L_1$ exhibited by active inductor 900 is given by EQN. 13 below, where $g_{m\_ota9}$ is transconductance of transconductance amplifier 910, $g_{m\_FET9}$ is transconductance of PMOS FET 902, $C_{908}$ is capacitance of tank capacitor 908, and $K_9$ is a scaling factor that is equal to $R_{912}/(R_{912}+R_{914})$. Furthermore, in particular embodiments of active inductor 900, control circuitry 904 is configured such that (i) gain of transconductance amplifier 910 (product of $K_9$ and $g_{m\_ota9}$) is set to a relatively high value and (ii) magnitude of output current $It_{c\_9}$ is limited to a predetermined saturation current value $I_{sat\_9}$, where saturation current value $I_{sat\_9}$ is defined according to EQN. 14 below, for reasons analogous to those discussed above with respect to active inductor 500. For example, in certain embodiments, saturation current value $I_{sat\_9}$ is less than 50 percent of the product of $V_T/2$, $g_{m\_ota9}$, and $K_9$. As another example, in particular embodiments, saturation current value $I_{sat\_9}$ is less than 10 percent of the product of $V_T/2$, $g_{m\_ota9}$, and $K_9$. As a further example, in some embodiments, saturation current value $I_{sat\_9}$ is less than one percent of the product of $V_T/2$, $g_{m\_ota9}$, and $K_9$.

$$V_{reg\_1} = V_{ref\_9} \cdot \frac{(R_{912} + R_{914})}{R_{912}} \qquad \text{(EQN. 12)}$$

$$L_1 = \frac{C_{908}}{K_9 g_{m\_ota9} \cdot g_{m\_FET9}} \qquad \text{(EQN. 13)}$$

$$I_{sat\_9} \ll \frac{V_T}{2} \cdot g_{m\_ota9} \cdot K_9 \qquad \text{(EQN. 14)}$$

Figure 10:
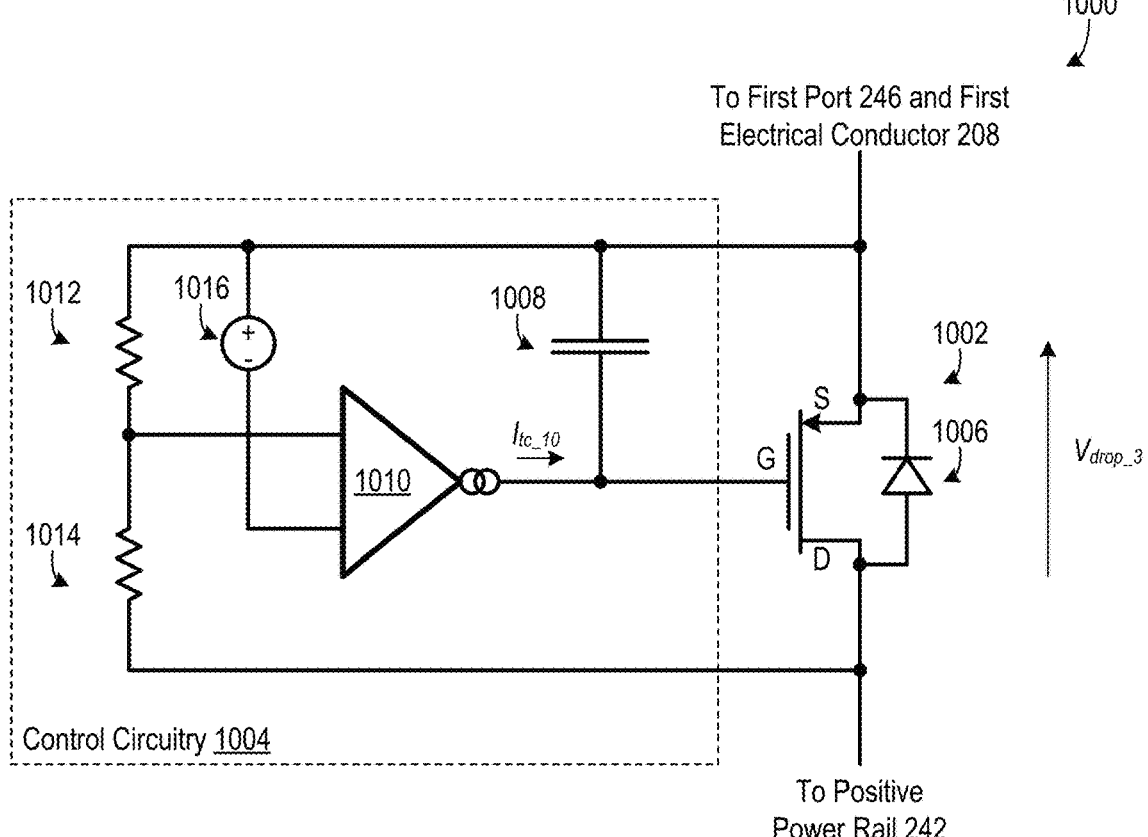
FIG. 10 is a schematic diagram of another embodiment of the first active inductor of the second station of the FIG. 2 DoP system.

Active inductor 260 of station 204 could be embodied in a manner similar to active inductor 900. For example, FIG. 10 is a schematic diagram of an active inductor 1000, which is another possible embodiment of active inductor 260 of station 204. Active inductor 1000 includes a PMOS FET 1002 and control circuitry 1004 which are analogous to PMOS FET 902 and control circuitry 904, respectively. PMOS FET 1002 includes a drain D, a source S, a gate G, and a parasitic body diode 1006. Source S of PMOS FET 1002 is electrically coupled to first port 246 and first electrical conductor 208, and drain D of PMOS FET 1002 is electrically coupled to positive power rail 242. Control circuitry 1004 includes a tank capacitor 1008, a transconductance amplifier 1010, a resistor 1012, a resistor 1014, and a reference voltage source 1016, which are analogous to tank capacitor 908, transconductance amplifier 910, resistor 912, resistor 914, and reference voltage source 916, respectively. Active inductor 1000 accordingly operates in a manner analogous to that of active inductor 900. For example, active inductor 1000 operates in a manner analogous to active inductor 900 to regulate magnitude of voltage $V_{drop\_3}$ to predetermined steady-value $V_{reg\_3}$ during steady-state operation of active inductor 1000. Additionally, active inductor 1000 operates in a manner analogous to active inductor 900 to exhibit an inductance of $L_3$ in response to dynamic current flowing through PMOS FET 1002. Furthermore, some embodiments of active inductor 1000 are configured to limit magnitude of an output current $It_{c\_10}$ generated by transconductance amplifier 1010 to a predetermined saturation value $I_{sat\_10}$ to boost effective inductance exhibited by active inductor 1000 during a large signal transient event, such as during transmission of differential data signal $V_T$ via electrical bus 206.

Figure 11:
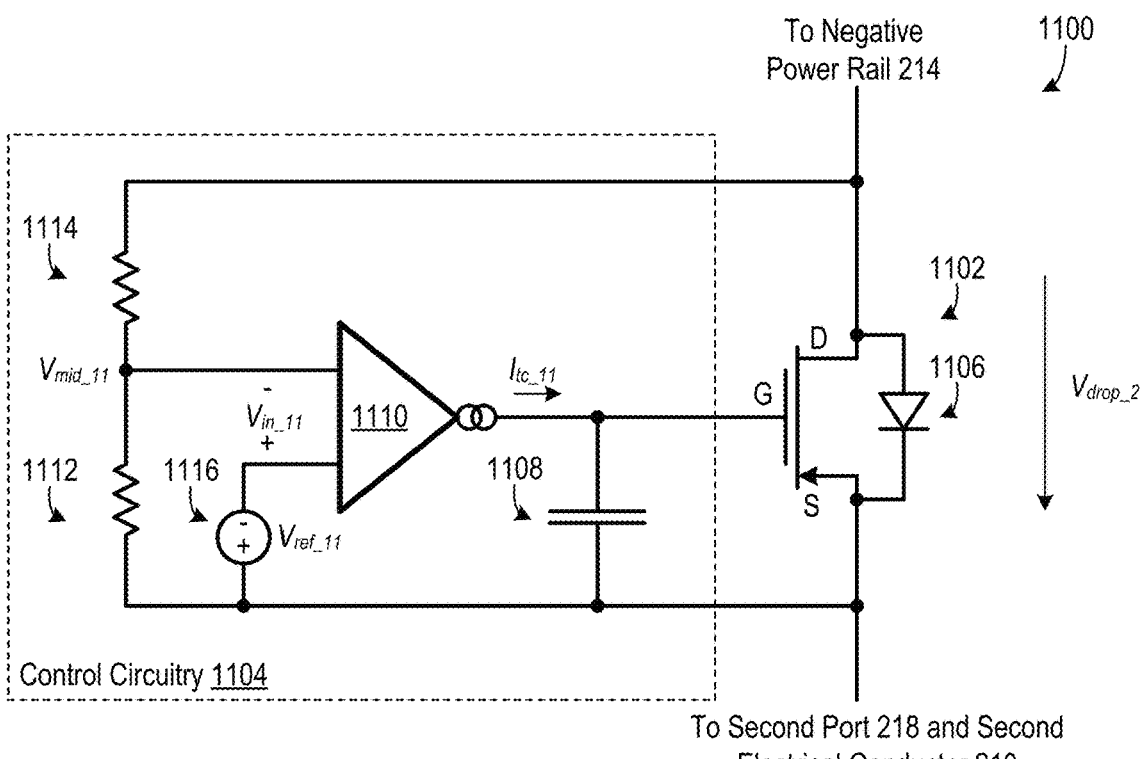
FIG. 11 is a schematic diagram of another embodiment of the second active inductor of the first station of the FIG. 2 DoP system.

FIG. 11 is a schematic diagram of an active inductor 1100, where active inductor 1100 is another possible embodiment of active inductor 232 of FIG. 2. Active inductor 1100 includes a PMOS FET 1102 and control circuitry 1104, where PMOS FET 1102 is an embodiment of pass element 238 and control circuitry 1104 is an embodiment of control circuitry 240. PMOS FET 1102 includes a drain D, a source S, a gate G, and a parasitic body diode 1106. Drain D of PMOS FET 1102 is electrically coupled to negative power rail 214, and source S of PMOS FET 1102 is electrically coupled to second port 218 and second electrical conductor 210. Control circuitry 1104 includes a tank capacitor 1108, a transconductance amplifier 1110, a resistor 1112, a resistor 1114, and a reference voltage source 1116. Tank capacitor 1108 is electrically coupled between gate G and source S of PMOS FET 1102. Resistor 1112 and resistor 1114 are electrically coupled in series between source S and drain D of PMOS FET 1102. Reference voltage source 1116 is referenced to source S of PMOS FET 1102, and reference voltage source 1116 generates a reference voltage $V_{ref\_11}$. Transconductance amplifier 1110 is configured to generate an output current $It_{c\_11}$ proportional to an input voltage $V_{in\_11}$ of transconductance amplifier 1110, where input voltage $V_{in\_11}$ is equal to a difference between a voltage $V_{mid\_11}$ and a reference voltage $V_{ref\_11}$. Voltage $V_{mid\_11}$ is a voltage at a voltage divider mid-point between resistor 1112 and resistor 1114, and voltage $V_{mid\_11}$ is accordingly associated with voltage $V_{drop\_2}$. Transconductance amplifier 1110 drives each of gate G of PMOS FET 1102 and tank capacitor 1108 via output current $It_{c\_11}$ of transconductance amplifier 1110, to control PMOS FET 1102.

PMOS FET 1102 regulates magnitude of voltage $V_{drop\_2}$ under the control of control circuitry 1104 to predetermined value $V_{reg\_2}$ during steady-state operation of active inductor 1100 according to EQN. 15 below, where $R_{1112}$ is resistance of resistor 1112 and $R_{1114}$ is resistance of resistor 1114. Therefore, magnitude of voltage $V_{reg\_2}$ can be adjusted during the design of active inductor 1100 by varying one or more of $R_{1112}$, $R_{1114}$, and $V_{ref\_11}$. Additionally, control circuitry 1104 controls PMOS FET 1102 such that active inductor 1100 exhibits an effective inductance of $L_2$ in response to change in voltage across $V_{drop\_2}$ across PMOS FET 1102. Inductance $L_2$ exhibited by active inductor 1100 is given by EQN. 16 below, where $g_{m\_ota11}$ is transconductance of transconductance amplifier 1110, $g_{m\_FET11}$ is transconductance of PMOS FET 1102, $C_{1108}$ is capacitance of tank capacitor 1108, and $K_{11}$ is a scaling factor that is equal to $R_{1112}/(R_{1112}+R_{1114})$. Furthermore, in particular embodiments of active inductor 1100, control circuitry 1104 is configured such that (i) gain of transconductance amplifier 1110 (product of $K_{11}$ and $g_{m\_ota11}$) is set to a relatively high value and (ii) magnitude of output current $It_{c\_11}$ is limited to a predetermined saturation current value $I_{sat\_11}$, where saturation current value $I_{sat\_11}$ is defined according to EQN. 17 below, for reasons analogous to those discussed above with respect to active inductor 500. For example, in certain embodiments, saturation current value $I_{sat\_11}$ is less than 50 percent of the product of $V_T/2$, $g_{m\_ota11}$, and $K_{11}$. As another example, in particular embodiments, saturation current value $I_{sat\_11}$ is less than 10 percent of the product of $V_T/2$, $g_{m\_ota11}$, and $K_{11}$. As a further example, in some embodiments, saturation current value $I_{sat\_11}$ is less than one percent of the product of $V_T/2$, $g_{m\_ota11}$, and $K_{11}$.

$$V_{drop\_2} = V_{ref\_11} \cdot \frac{(R_{1112} + R_{1114})}{R_{1112}} \qquad \text{(EQN. 15)}$$

$$L_2 = \frac{C_{1108}}{g_{m\_ota11} \cdot g_{m\_FET11} \cdot K_{11}} \qquad \text{(EQN. 16)}$$

$$I_{sat\_11} \ll \frac{V_T}{2} \cdot g_{m\_ota11} \cdot K_{11} \qquad \text{(EQN. 17)}$$

Figure 12:
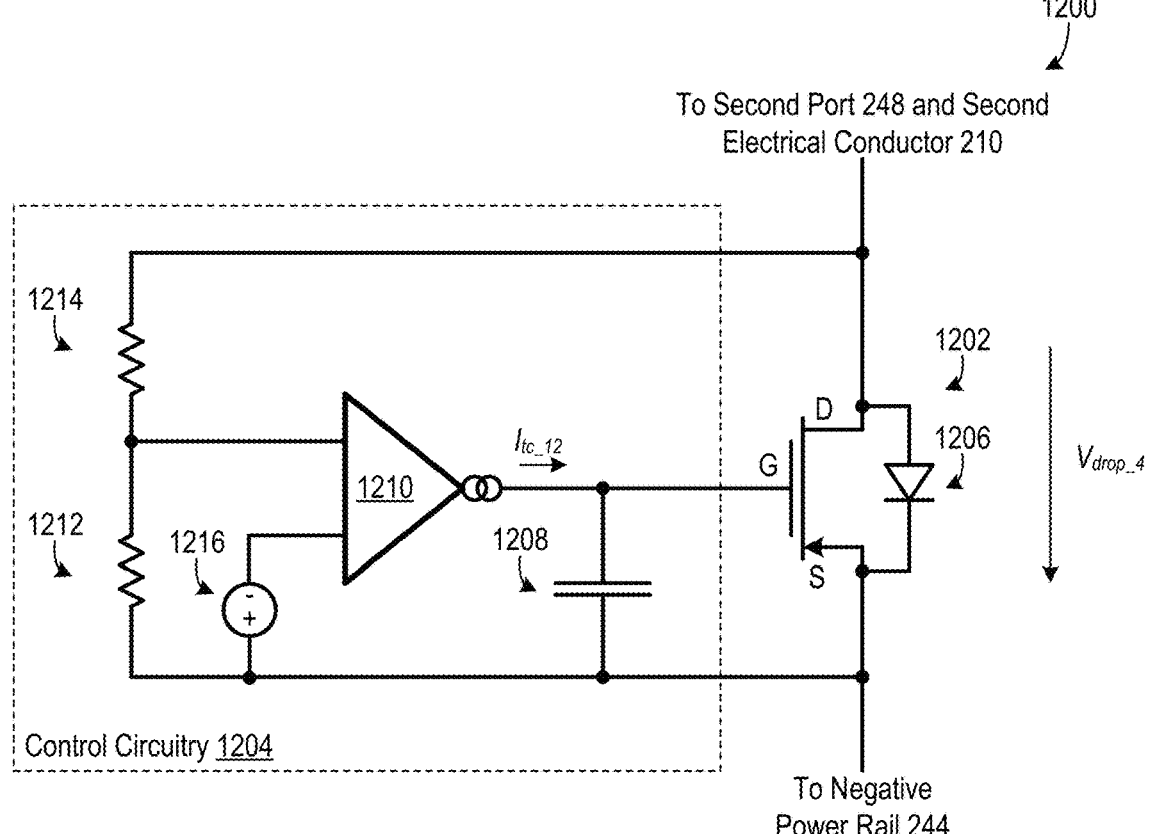
FIG. 12 is a schematic diagram of another embodiment of the second active inductor of the second station of the FIG. 2 DoP system.

Active inductor 262 of station 204 could be embodied in a manner similar to active inductor 1100. For example, FIG. 12 is a schematic diagram of an active inductor 1200, which is another possible embodiment of active inductor 262 of station 204. Active inductor 1200 includes a PMOS FET 1202 and control circuitry 1204, which are analogous to PMOS FET 1102 and control circuitry 1104, respectively. PMOS FET 1202 is an embodiment of pass element 268, and control circuitry 1204 is an embodiment of control circuitry 270. PMOS FET 1202 includes a drain D, a source S, a gate G, and a parasitic body diode 1206. Drain D of PMOS FET 1202 is electrically coupled to second port 248 and second electrical conductor 210, and source S of PMOS FET 1202 is electrically coupled to negative power rail 244. Control circuitry 1204 includes a tank capacitor 1208, a transconductance amplifier 1210, a resistor 1212, a resistor 1214, and a reference voltage source 1216, which are analogous to tank capacitor 1108, transconductance amplifier 1110, resistor 1112, resistor 1114, and reference voltage source 1116, respectively. Active inductor 1200 accordingly operates in a manner analogous to that of active inductor 1100. For example, active inductor 1200 operates in a manner analogous to active inductor 1100 to regulate magnitude of voltage $V_{drop\_4}$ to predetermined value $V_{reg\_4}$ during steady-state operation of active inductor 1200. Additionally, active inductor 1200 operates in a manner analogous to active inductor 1100 to exhibit an inductance of $L_4$ in response to change in voltage $V_{drop\_4}$ across PMOS FET 1202. Furthermore, some embodiments of active inductor 1200 are configured to limit magnitude of an output current $It_{c\_12}$ generated by transconductance amplifier 1210 to a predetermined saturation value $I_{sat\_12}$ to boost effective inductance exhibited by active inductor 1200 during a large signal transient event, such as during transmission of differential data signal $V_T$ via electrical bus 206.

Referring again to FIG. 2, two or more of pass element 234, pass element 238, pass element 264, and pass element 268 could be embodied using different respective types of transistors. For example, in some embodiments, pass element 234 is embodied by a PMOS FET, such as discussed above with respect to FIG. 9, while pass element 238 is embodied by an NMOS FET, such as discussed above with respect to FIG. 7. As another example, in certain embodiments, pass element 234 is embodied by an NMOS FET, such as discussed above with respect to FIG. 5, while pass element 238 is embodied by a PMOS FET, such as discussed above with respect to FIG. 11.

Figure 13:
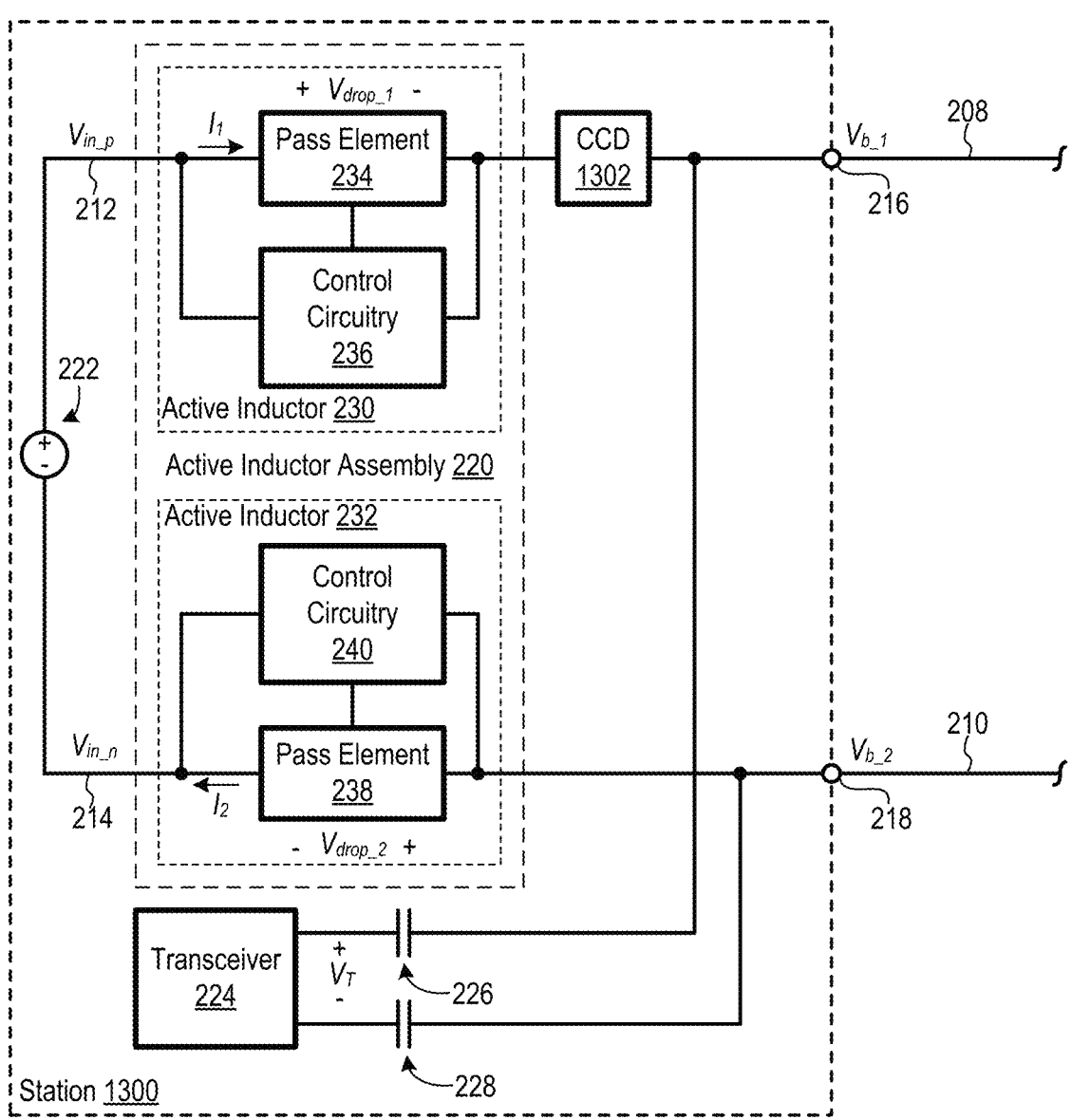
FIG. 13 is a schematic diagram of an alternate embodiment of the first station of the FIG. 2 DoP system that further includes a diode.

DoP system 200 could be modified to include one or more additional stations, such as one or more additional instances of station 202 and/or one or more additional instances of station 204. Additionally, station 202 could be modified to include features to facilitate electrically coupling a plurality of instances of station 202 to electrical bus 206. For example, FIG. 13 is a schematic diagram of a station 1300, which is an alternate embodiment of station 202 that further includes a current control device (CCD) 1302 electrically coupling pass element 234 and control circuitry 236 to first port 216. Current control device 1302 is configured to limit flow of current therethrough to a single direction, i.e., from pass element 234 to first port 216. In some embodiments, current control device 1302 includes a diode or active electronic circuitry configured to emulate a diode. Current control device 1302 is used, for example, to enable multiple instances of station 1300 to be electrically coupled in parallel to electrical bus 206.

Figure 14:
FIG. 14 is a schematic diagram of an alternate embodiment of the FIG. 2 DoP system including additional stations.

FIG. 14 is a schematic diagram of a DoP system 200, which is an alternate of DoP system 200 including two instances of station 1300 in place of station 202, as well as two instances of station 204. In this document, specific instances of an item may be referred to by use of a numeral in parentheses (e.g. station 1300(1)) while numerals without parentheses refer to any such item (e.g. stations 1300). Stations 1300(1) and 1300(2) are electrically coupled in parallel to electrical bus 206, and stations 204(1) and 204(2) are electrically coupled to electrical bus 206. Details of stations 1300 and details of stations 204 are not shown in FIG. 14 for illustrative clarity. Whichever station 1300 that has the highest voltage across its respective first port 216 and second port 218 will provide electrical power to respective loads of stations 204 via electrical bus 206. Stations 1300(1) and 1300(2) share electrical bus 206 for transmission and/or reception of respective data signals, for example, using a time division multiplexing technique and/or a frequency division multiplexing technique. Likewise, stations 204(1) and 204(2) share electrical bus 206 for transmission and/or reception of respective data signals, for example, using a time division multiplexing technique and/or a frequency division multiplexing technique.

Figure 15:
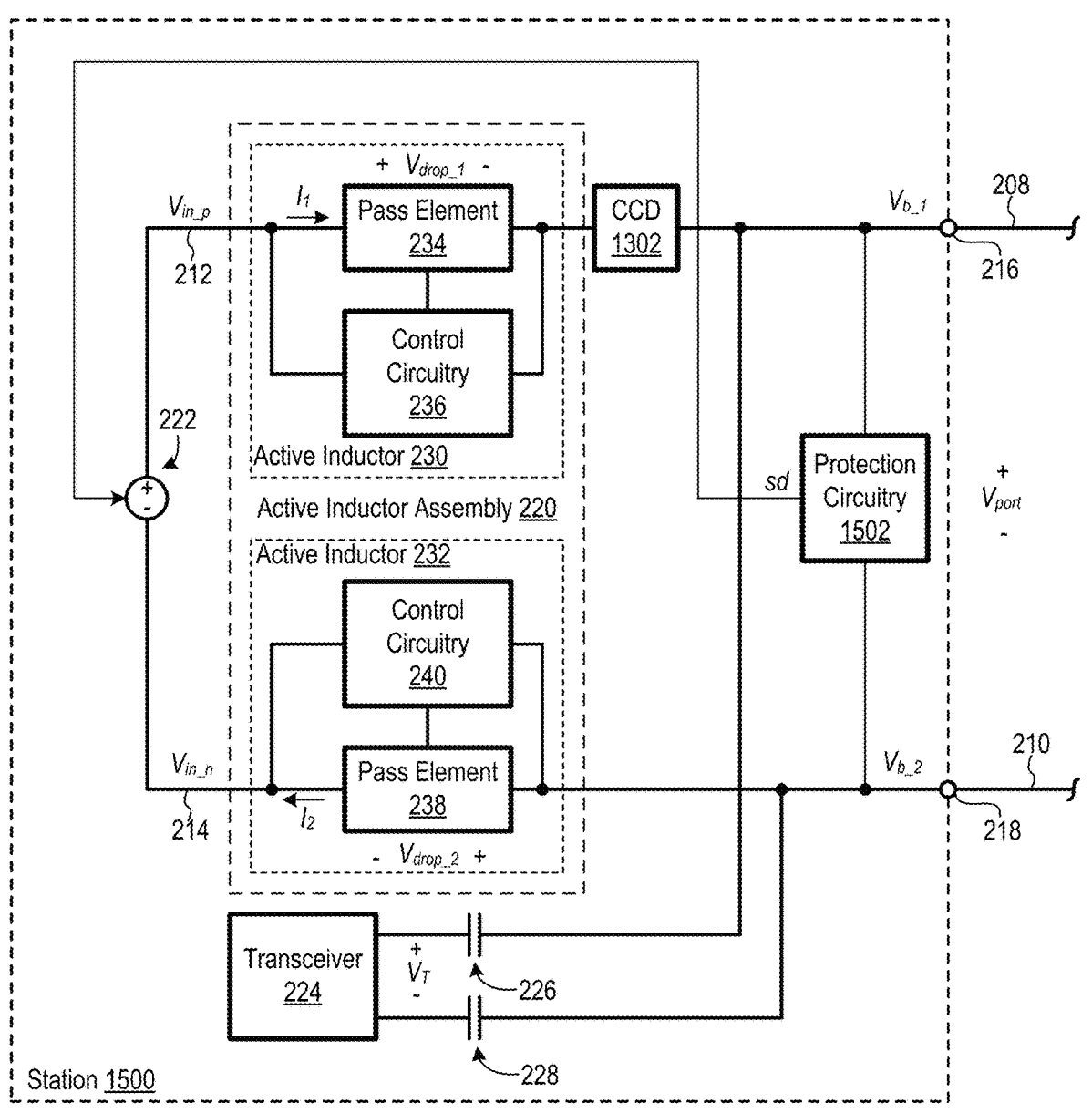
FIG. 15 is a schematic diagram of alternate embodiment of the FIG. 13 station further including protection circuitry.

In some applications, there is a possibility that two or more instances of station 1300 may be electrically coupled in parallel to electrical bus 206 with conflicting polarity, such that a first port 216 of one instance of station 1300 is connected to a second port 218 of another instance of station 1300. For example, a user may inadvertently connect two or more stations in parallel with conflicting polarity, or polarity of first electrical conductor 208 and second electrical conductor 210 might not be specified. Such conflicting polarity may cause damage to one or more instances of station 1300 and/or electrical bus 206. Accordingly, certain alternate embodiments of station 1300 further include protection circuitry configured to shut down the station in the event of a polarity conflict with another station instance. For example, FIG. 15 is a schematic diagram of a station 1500, which is an alternate embodiment of station 1300 (FIG. 13) further including protection circuitry 1502. Protection circuitry 1502 is configured to monitor a voltage $V_{port}$ between first port 216 and second port 218, and protection circuitry 1502 is configured to assert a signal sd to shut down power supply 222 in response to voltage $V_{port}$ having an abnormal value, such as due to another station being connected to station 1500 with conflicting polarity. An abnormal value of voltage $V_{port}$ is, for example, a value of voltage $V_{port}$ having a magnitude that is below a threshold value and/or a value of voltage $V_{port}$ that is negative. Protection circuitry 1502 could be replaced with, or supplemented by, current protection circuitry (not shown) and/or thermal protection circuitry (not shown), where (i) the current protection circuitry is configured to assert signal sd in response to an over-current condition, such as due to another station being connected to station 1500 with conflicting polarity and (i) the thermal protection circuitry is configured to assert signal sd in response to an over-temperature condition, such as due to another station being connected to station 1500 with conflicting polarity.

Referring again to FIG. 2, station 202 is electrically coupled to electrical bus 206 such that voltage $V_{b\_1}$ on first electrical conductor 208 is greater than voltage $V_{b\_2}$ on second electrical conductor 210. However, in some alternate embodiments of DoP system 200, there is the possibility that voltage $V_{b\_1}$ on first electrical conductor may be less than voltage $V_{b\_2}$ on second electrical conductor 210, such as if connections between station 202 and electrical bus 206 are swapped. Accordingly, certain alternate embodiments of station 204 further include rectification circuitry to enable station 204 to operate irrespective of polarity of voltage between first electrical conductor 208 and second electrical conductor 210.

Figure 16:
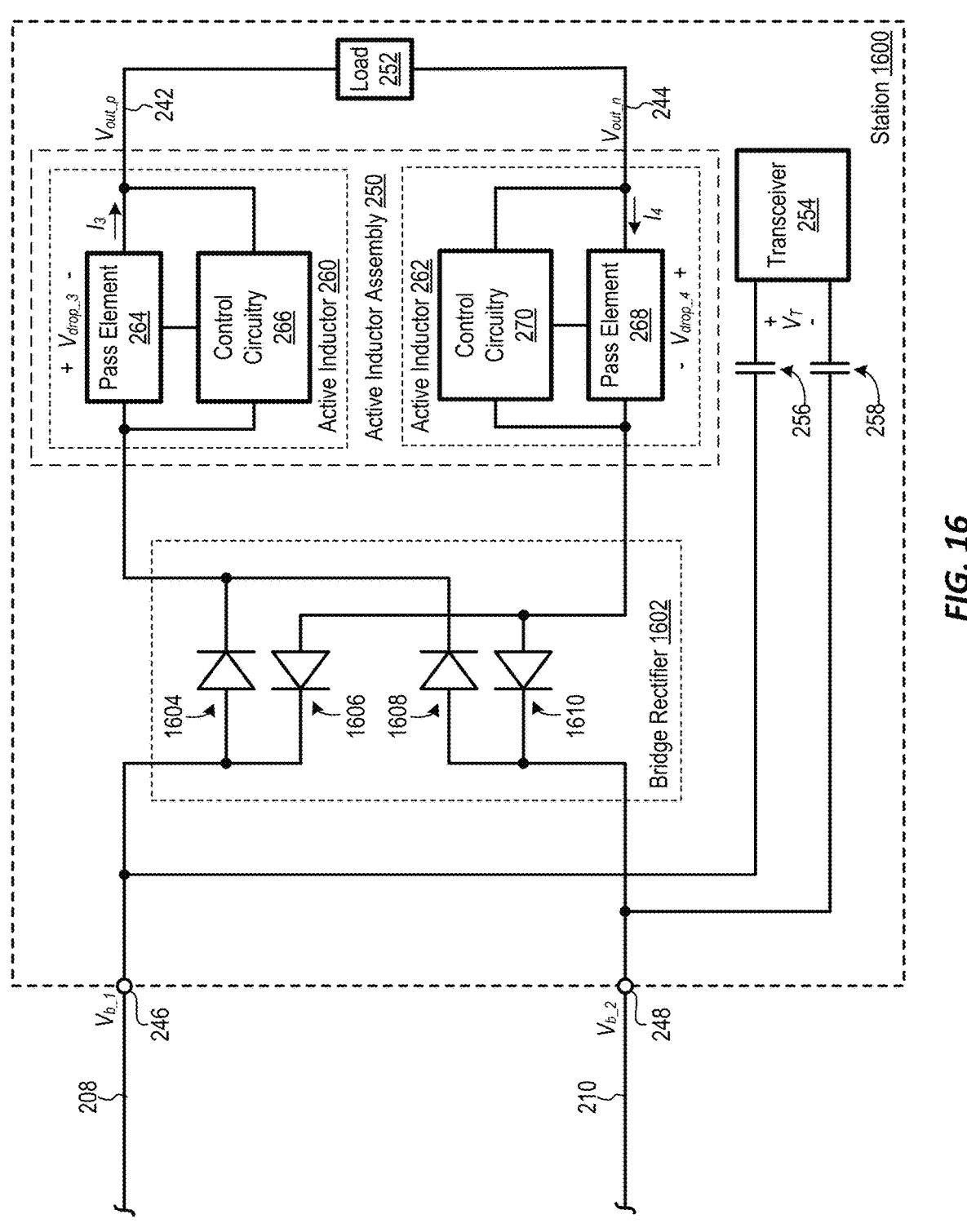
FIG. 16 is a schematic diagram of an alternate embodiment of the second station of the FIG. 2 DoP system that further includes a bridge rectifier

For example, FIG. 16 is a schematic diagram of a station 1600, where station 1600 is an alternate embodiment of station 204 further including a bridge rectifier 1602. Bridge rectifier 1602 includes a first diode 1604, a second diode 1606, a third diode 1608, and a fourth diode 1610. First diode 1604 is electrically coupled between first port 246 and pass element 264 such that current may flow from first port 246 to pass element 264. Second diode 1606 is electrically coupled between pass element 268 and first port 246 such that current may flow from pass element 268 to first port 246. Third diode 1608 is electrically coupled between second port 248 and pass element 264 such that current may flow from second port 248 to pass element 264. Fourth diode 1610 is electrically coupled between pass element 268 and second port 248 such that fourth diode 1610 enables current to flow from pass element 268 to second port 248. Consequently, pass element 264 and control circuitry 266 are electrically coupled to each of first port 246 and second port 248 via bridge rectifier 1602, and pass element 268 and control circuitry 270 are electrically coupled to each of first port 246 and second port 248 via bridge rectifier 1602. Accordingly, bridge rectifier 1602 enables station 1600 to operate irrespective of polarity of voltage between first electrical conductor 208 and second electrical conductor 210.

Referring again to FIG. 2, DoP system 200 could be further modified as long as DoP system 200 includes an embodiment of the new active inductor assemblies disclosed herein. For example, transceiver 224 and transceiver 254 could be modified to transmit and/or receive single-ended data signals, instead of differential data signals. As another example, station 202 and/or station 204 could be modified to include one or more additional elements, such as to provide additional functionality to station 202 and/or to station 204.

Combination of Features

Features described above may be combined in various ways without departing from the scope hereof. The following examples illustrate some possible combinations.

(A1) An active inductor assembly for a data over power (DoP) system includes a first active inductor and a second active inductor. The first active inductor includes (1) a first pass element configured to be electrically coupled between a positive power rail of the DoP system and a first electrical conductor of the DoP system and (2) first control circuitry configured to control the first pass element such that (i) the first pass element emulates a first inductor in response to a change in voltage across the first pass element and (ii) the first pass element regulates a voltage drop across the first pass element to a first predetermined value during steady-state operation of the first active inductor. The second active inductor includes (1) a second pass element configured to be electrically coupled between a negative power rail of the DoP system and a second electrical conductor of the DoP system and (2) second control circuitry configured to control the second pass element such that (i) the second pass element emulates a second inductor in response to a change in voltage across the second pass element and (ii) the second pass element regulates a voltage drop across the second pass element to a second predetermined value during steady-state operation of the second active inductor.

(A2) In the active inductor assembly denoted as (A1), (1) the first pass element may include a first transistor, and (2) the second pass element may include a second transistor.

(A3) In the active inductor assembly denoted as (A1), (1) the first pass element may include a first enhancement mode, field effect transistor (first FET), (2) the first control circuitry may be configured to control the first pass element at least partially by driving a gate of the first FET, (3) the second pass element may include a second enhancement mode, field effect transistor (second FET), and (4) the second control circuitry may be configured to control the second pass element at least partially by driving a gate of the second FET.

(A4) In the active inductor assembly denoted as (A3), (1) the first control circuitry may include (a) a first tank capacitor electrically coupled to the gate of the first FET and (b) a first transconductance amplifier configured to drive each of (i) the gate of the first FET and (ii) the first tank capacitor, via an output current of the first transconductance amplifier, and (2) the second control circuitry may include (a) a second tank capacitor electrically coupled to the gate of the second FET and (b) a second transconductance amplifier configured to drive each of (i) the gate of the second FET and (ii) the second tank capacitor, via an output current of the second transconductance amplifier.

(A5) In the active inductor assembly denoted as (A4), (1) the first transconductance amplifier may be configured such that a magnitude of the output current of the first transconductance amplifier is limited to a first predetermined saturation current value, such that an effective inductance of the first active inductor is greater when the DoP system is transmitting a data signal than when the DoP system is not transmitting a data signal, and (2) the second transconductance amplifier may be configured such that a magnitude of the output current of the second transconductance amplifier is limited to a second predetermined saturation current value, such that an effective inductance of the second active inductor is greater when the DoP system is transmitting a data signal than when the DoP system is not transmitting a data signal.

(A6) In either one of the active inductor assemblies denoted as (A4) and (A5), (1) the first transconductance amplifier may be configured to generate the output current of the first transconductance amplifier in response to a difference between (i) a first reference voltage value and a (ii) a voltage associated with the voltage drop across the first pass element, and (2) the second transconductance amplifier may be configured to generate the output current of the second transconductance amplifier in response to a difference between (i) a second reference voltage value and a (ii) a voltage associated with the voltage drop across the second pass element.

(B1) A station for a data over power (DoP) system includes (1) a positive power rail, (2) a negative power rail, (3) a first port configured to electrically couple the station to a first electrical conductor of the DoP system, (4) a second port configured to electrically couple the station to a second electrical conductor of the DoP system, (5) a first active inductor, and (6) a second active inductor. The first active inductor includes (1) a first pass element electrically coupled between the positive power rail and the first port and (2) first control circuitry configured to control the first pass element such that (i) the first pass element emulates a first inductor in response to a change in voltage across the first pass element and (ii) the first pass element regulates a voltage drop across the first pass element to a first predetermined value during steady-state operation of the first active inductor. The second active inductor includes (1) a second pass element electrically coupled between the negative power rail and the second port and (2) second control circuitry configured to control the second pass element such that (i) the second pass element emulates a second inductor in response to a change in voltage across the second pass element and (ii) the second pass element regulates a voltage drop across the second pass element to a second predetermined value during steady-state operation of the second active inductor.

(B2) The station denoted as (B1) may further include a power supply electrically coupled between the positive power rail and the negative power rail.

(B3) Either one of the stations denoted as (B1) and (B2) may further include a load electrically coupled between the positive power rail and the negative power rail.

(B4) Any one of the stations denoted as (B1) through (B3) may further include (1) a transceiver, (2) a first data coupling capacitor configured to electrically couple a first component of a data signal between the transceiver and the first port, and (3) a second data coupling capacitor configured to electrically couple a second component of the data signal between the transceiver and the second port.

(B5) In any one of the stations denoted as (B1) through (B4), (1) the first pass element may include a first enhancement mode, field effect transistor (first FET), (2) the first control circuitry may be configured to control the first pass element at least partially by driving a gate of the first FET, (3) the second pass element may include a second enhancement mode, field effect transistor (second FET), and (4) the second control circuitry may be configured to control the second pass element at least partially by driving a gate of the second FET.

(B6) In the station denoted as (B5), (1) the first control circuitry may include (a) a first tank capacitor electrically coupled to the gate of the first FET and (b) a first transconductance amplifier configured to drive each of (i) the gate of the first FET and (ii) the first tank capacitor, via an output current of the first transconductance amplifier, and (2) the second control circuitry may include (a) a second tank capacitor electrically coupled to the gate of the second FET and (b) a second transconductance amplifier configured to drive each of (i) the gate of the second FET and (ii) the second tank capacitor, via an output current of the second transconductance amplifier.

(B7) In the station denoted as (B6), (1) the first transconductance amplifier may be configured such that a magnitude of the output current of the first transconductance amplifier is limited to a first saturation current value, such that an effective inductance of the first active inductor is greater when the DoP system is transmitting a data signal than when the DoP system is not transmitting a data signal, and (2) the second transconductance amplifier may be configured such that a magnitude of the output current of the second transconductance amplifier is limited to a second saturation current value, such that an effective inductance of the second active inductor is greater when the DoP system is transmitting a data signal than when the DoP system is not transmitting a data signal.

(B8) In either one of the stations denoted as (B6) and (B7), (1) the first transconductance amplifier may be configured to generate the output current of the first transconductance amplifier in response to a difference between (i) a first reference voltage value and a (ii) a voltage associated with the voltage drop across the first pass element, and (2) the second transconductance amplifier may be configured to generate the output current of the second transconductance amplifier in response to a difference between (i) a second reference voltage value and a (ii) a voltage associated with the voltage drop across the second pass element.

(B9) In any one of the stations denoted as (B1) though (B8), the first pass element may be electrically coupled to the first port via a current control device configured to limit flow of current therethrough to a single direction.

(B10) Any one of the stations denoted as (B1) though (B9) may further include a bridge rectifier where (1) the first pass element is electrically coupled to each of the first port and the second port via the bridge rectifier and (2) the second pass element is electrically coupled to each of the first port and the second port via the bridge rectifier.

(C1) A method for electronically emulating inductance in a station of a data over power (DoP) system includes (1) controlling a first transistor of a first active inductor to (i) regulate a voltage drop across the first transistor to a first predetermined value during steady-state operation of the first active inductor and (ii) emulate an inductor in response to a change in voltage across the first transistor, the first transistor being electrically coupled between a positive power rail of the station and a first electrical conductor of the DoP system, and (2) controlling a second transistor of a second active inductor (i) regulate a voltage drop across the second transistor to a second predetermined value during steady-state operation of the second active inductor and (ii) emulate an inductor in response to a change in voltage across the second transistor, the second transistor being electrically coupled between a negative power rail of the station and a second electrical conductor of the DoP system.

(C2) In the method denoted as (C1), (1) the first transistor may include a first field effect transistor (first FET), (2) the second transistor may include a second field effect transistor (second FET), (3) controlling the first transistor may include driving each of (i) a gate of the first FET and (ii) a first tank capacitor, via an output current of a first transconductance amplifier, and (4) controlling the second transistor may include driving each of (i) a gate of the second FET and (ii) a second tank capacitor, via an output current of a second transconductance amplifier.

(C3) The method denoted as (C2) may further include (1) limiting magnitude of the output current of the first transconductance amplifier to a first predetermined saturation current value, such that an effective inductance of the first active inductor is greater when the DoP system is transmitting a data signal than when the DoP system is not transmitting a data signal, and (2) limiting magnitude of the output current of the second transconductance amplifier to a second predetermined saturation current value, such that an effective inductance of the second active inductor is greater when the DoP system is transmitting a data signal than when the DoP system is not transmitting a data signal.

(C4) In any one of the methods denoted as (C1) through (C3), (1) the first transistor may be electrically coupled to the first electrical conductor of the DoP system via one or more first diodes, and (2) the second transistor may be electrically coupled to the second electrical conductor of the DoP system via one or more second diodes.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. An active inductor assembly for a data over power (DoP) system, the active inductor assembly comprising:
    a first active inductor, the first active inductor including:
        a first pass element configured to be electrically coupled between a positive power rail of the DoP system and a first electrical conductor of the DoP system, and
        first control circuitry configured to control the first pass element such that:
            the first pass element emulates a first inductor in response to a change in voltage across the first pass element, and
            the first pass element regulates a voltage drop across the first pass element to a first predetermined value during steady-state operation of the first active inductor; and
    a second active inductor, the second active inductor including:
        a second pass element configured to be electrically coupled between a negative power rail of the DoP system and a second electrical conductor of the DoP system, and
        second control circuitry configured to control the second pass element such that:
            the second pass element emulates a second inductor in response to a change in voltage across the second pass element, and
            the second pass element regulates a voltage drop across the second pass element to a second predetermined value during steady-state operation of the second active inductor.

2. The active inductor assembly of claim 1, wherein:
the first pass element comprises a first transistor; and
the second pass element comprises a second transistor.

3. The active inductor assembly of claim 1, wherein:
the first pass element comprises a first enhancement mode, field effect transistor (first FET);

the first control circuitry is configured to control the first pass element at least partially by driving a gate of the first FET;
the second pass element comprises a second enhancement mode, field effect transistor (second FET); and
the second control circuitry is configured to control the second pass element at least partially by driving a gate of the second FET.

4. The active inductor assembly of claim 3, wherein:
the first control circuitry comprises:
    a first tank capacitor electrically coupled to the gate of the first FET, and
    a first transconductance amplifier configured to drive each of (i) the gate of the first FET and (ii) the first tank capacitor, via an output current of the first transconductance amplifier; and
the second control circuitry comprises:
    a second tank capacitor electrically coupled to the gate of the second FET, and
    a second transconductance amplifier configured to drive each of (i) the gate of the second FET and (ii) the second tank capacitor, via an output current of the second transconductance amplifier.

5. The active inductor assembly of claim 4, wherein:
the first transconductance amplifier is configured such that a magnitude of the output current of the first transconductance amplifier is limited to a first predetermined saturation current value, such that an effective inductance of the first active inductor is greater when the DoP system is transmitting a data signal than when the DoP system is not transmitting a data signal; and
the second transconductance amplifier is configured such that a magnitude of the output current of the second transconductance amplifier is limited to a second predetermined saturation current value, such that an effective inductance of the second active inductor is greater when the DoP system is transmitting a data signal than when the DoP system is not transmitting a data signal.

6. The active inductor assembly of claim 4, wherein:
the first transconductance amplifier is configured to generate the output current of the first transconductance amplifier in response to a difference between (i) a first reference voltage value and a (ii) a voltage associated with the voltage drop across the first pass element; and
the second transconductance amplifier is configured to generate the output current of the second transconductance amplifier in response to a difference between (i) a second reference voltage value and a (ii) a voltage associated with the voltage drop across the second pass element.

7. A station for a data over power (DoP) system, the station comprising:
    a positive power rail;
    a negative power rail;
    a first port configured to electrically couple the station to a first electrical conductor of the DoP system;
    a second port configured to electrically couple the station to a second electrical conductor of the DoP system;
    a first active inductor, the first active inductor including:
        a first pass element electrically coupled between the positive power rail and the first port, and
        first control circuitry configured to control the first pass element such that:
            the first pass element emulates a first inductor in response to a change in voltage across the first pass element, and the first pass element regulates a voltage drop across the first pass element to a first predetermined value during steady-state operation of the first active inductor; and a second active inductor, the second active inductor including:

a second pass element electrically coupled between the negative power rail and the second port, and second control circuitry configured to control the second pass element such that:

the second pass element emulates a second inductor in response to a change in voltage across the second pass element, and the second pass element regulates a voltage drop across the second pass element to a second predetermined value during steady-state operation of the second active inductor.

8. The station of claim 7, further comprising a power supply electrically coupled between the positive power rail and the negative power rail.

9. The station of claim 7, further comprising a load electrically coupled between the positive power rail and the negative power rail.

10. The station of claim 7, further comprising:

a transceiver;

a first data coupling capacitor configured to electrically couple a first component of a data signal between the transceiver and the first port; and a second data coupling capacitor configured to electrically couple a second component of the data signal between the transceiver and the second port.

11. The station of claim 7, wherein:

the first pass element comprises a first enhancement mode, field effect transistor (first FET);

the first control circuitry is configured to control the first pass element at least partially by driving a gate of the first FET;

the second pass element comprises a second enhancement mode, field effect transistor (second FET); and the second control circuitry is configured to control the second pass element at least partially by driving a gate of the second FET.

12. The station of claim 11, wherein:

the first control circuitry comprises:

a first tank capacitor electrically coupled to the gate of the first FET, and a first transconductance amplifier configured to drive each of (i) the gate of the first FET and (ii) the first tank capacitor, via an output current of the first transconductance amplifier; and the second control circuitry comprises:

a second tank capacitor electrically coupled to the gate of the second FET, and a second transconductance amplifier configured to drive each of (i) the gate of the second FET and (ii) the second tank capacitor, via an output current of the second transconductance amplifier.

13. The station of claim 12, wherein:

the first transconductance amplifier is configured such that a magnitude of the output current of the first transconductance amplifier is limited to a first saturation current value, such that an effective inductance of the first active inductor is greater when the DoP system is transmitting a data signal than when the DoP system is not transmitting a data signal; and the second transconductance amplifier is configured such that a magnitude of the output current of the second transconductance amplifier is limited to a second saturation current value, such that an effective inductance of the second active inductor is greater when the DoP system is transmitting a data signal than when the DoP system is not transmitting a data signal.

14. The station of claim 12, wherein:

the first transconductance amplifier is configured to generate the output current of the first transconductance amplifier in response to a difference between (i) a first reference voltage value and a (ii) a voltage associated with the voltage drop across the first pass element; and the second transconductance amplifier is configured to generate the output current of the second transconductance amplifier in response to a difference between (i) a second reference voltage value and a (ii) a voltage associated with the voltage drop across the second pass element.

15. The station of claim 7, wherein the first pass element is electrically coupled to the first port via a current control device configured to limit flow of current therethrough to a single direction.

16. The station of claim 7, further comprising a bridge rectifier, wherein:

the first pass element is electrically coupled to each of the first port and the second port via the bridge rectifier; and the second pass element is electrically coupled to each of the first port and the second port via the bridge rectifier.

17. A method for electronically emulating inductance in a station of a data over power (DoP) system, the method comprising:

controlling a first transistor of a first active inductor to (i) regulate a voltage drop across the first transistor to a first predetermined value during steady-state operation of the first active inductor and (ii) emulate an inductor in response to a change in voltage across the first transistor, the first transistor being electrically coupled between a positive power rail of the station and a first electrical conductor of the DoP system; and controlling a second transistor of a second active inductor (i) regulate a voltage drop across the second transistor to a second predetermined value during steady-state operation of the second active inductor and (ii) emulate an inductor in response to a change in voltage across the second transistor, the second transistor being electrically coupled between a negative power rail of the station and a second electrical conductor of the DoP system.

18. The method of claim 17, wherein:

the first transistor comprises a first field effect transistor (first FET);

the second transistor comprises a second field effect transistor (second FET);

controlling the first transistor comprises driving each of (i) a gate of the first FET and (ii) a first tank capacitor, via an output current of a first transconductance amplifier; and controlling the second transistor comprises driving each of (i) a gate of the second FET and (ii) a second tank capacitor, via an output current of a second transconductance amplifier.

19. The method of claim 18, further comprising:

limiting magnitude of the output current of the first transconductance amplifier to a first predetermined saturation current value, such that an effective inductance of the first active inductor is greater when the DoP system is transmitting a data signal than when the DoP system is not transmitting a data signal; and limiting magnitude of the output current of the second transconductance amplifier to a second predetermined saturation current value, such that an effective inductance of the second active inductor is greater when the DoP system is transmitting a data signal than when the DoP system is not transmitting a data signal.

20. The method of claim 17, wherein:

the first transistor is electrically coupled to the first electrical conductor of the DoP system via one or more first diodes; and the second transistor is electrically coupled to the second electrical conductor of the DoP system via one or more second diodes.

* * * * *